(12) United States Patent
Aoyama et al.

(10) Patent No.: US 10,796,650 B2
(45) Date of Patent: Oct. 6, 2020

(54) LIQUID CRYSTAL DISPLAY DEVICE AND DRIVING METHOD THEREFOR

(71) Applicant: SHARP KABUSHIKI KAISHA, Sakai, Osaka (JP)

(72) Inventors: Iori Aoyama, Sakai (JP); Yuichi Kita, Sakai (JP); Takahiro Sasaki, Sakai (JP); Hidekazu Miyata, Sakai (JP); Kazutaka Hanaoka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 129 days.

(21) Appl. No.: 16/085,228

(22) PCT Filed: Mar. 14, 2017

(86) PCT No.: PCT/JP2017/010146
§ 371 (c)(1),
(2) Date: Feb. 15, 2019

(87) PCT Pub. No.: WO2017/159664
PCT Pub. Date: Sep. 21, 2017

(65) Prior Publication Data
US 2019/0164511 A1    May 30, 2019

(30) Foreign Application Priority Data

Mar. 16, 2016 (JP) .................. 2016-052191

(51) Int. Cl.
*G09G 3/36* (2006.01)
*G02F 1/1362* (2006.01)
(Continued)

(52) U.S. Cl.
CPC ..... *G09G 3/3614* (2013.01); *G02F 1/136213* (2013.01); *G09G 3/20* (2013.01);
(Continued)

(58) Field of Classification Search
CPC ...... G09G 3/3648; G09G 3/3614; G09G 3/36; G09G 3/3655; G09G 3/3611;
(Continued)

(56) References Cited

U.S. PATENT DOCUMENTS 8,907,917 B2 * 12/2014 Kim ..................... G06F 3/044
  345/174
8,941,569 B2 * 1/2015 Tsubata ............... G09G 3/3637
  345/87

(Continued)

FOREIGN PATENT DOCUMENTS

CN  101149540 A  3/2008
CN  102467894 A  5/2012
(Continued)

*Primary Examiner* — Dismery Mercedes
(74) *Attorney, Agent, or Firm* — ScienBiziP, P.C.

(57) ABSTRACT

In a liquid crystal display device (100), each pixel row group is selected by a common scan signal voltage, each pixel row group including N pixel rows which adjoin one another in a column direction. Where two pixel rows which adjoin each other in a column direction and which are included in different pixel row groups are a first pixel row and a second pixel row, the first pixel row includes a pixel which has a pixel electrode (16) capacitively coupled with a gate bus line (12) which is associated with the second pixel row. When the first pixel row is included in the $q^{th}$ group, the second pixel row is included in the $(q+1)^{th}$ group. A scan signal voltage supplied to gate bus lines which are associated with the $(q+1)^{th}$ group switches from low to high before a scan signal voltage supplied to gate bus lines which are associated with the $q^{th}$ group switches from high to low.

19 Claims, 21 Drawing Sheets

(51) Int. Cl.
*G09G 3/32* (2016.01)
*G09G 3/20* (2006.01)
*G09G 3/34* (2006.01)

(52) U.S. Cl.
CPC .............. *G09G 3/3413* (2013.01); *G09G 3/36* (2013.01); *G09G 3/3648* (2013.01); *G09G 3/3655* (2013.01); *G09G 3/3677* (2013.01); *G09G 3/3696* (2013.01); G09G 2300/0434 (2013.01); G09G 2300/0478 (2013.01); G09G 2310/021 (2013.01); G09G 2310/0205 (2013.01); G09G 2310/0235 (2013.01); G09G 2320/0233 (2013.01); G09G 2320/0252 (2013.01)

(58) Field of Classification Search
CPC ... G09G 2300/0426; G09G 2320/0252; G09G 2320/02; G09G 2320/0247; G09G 2310/0205; G09G 2310/08; G06F 3/0412; G06F 3/047; G06F 2203/01403; G02F 1/136286; G02F 1/13624; G02F 1/136213; G02F 2201/123; G02F 2201/134354
See application file for complete search history.

(56) References Cited

U.S. PATENT DOCUMENTS

| | | | | |
|---|---|---|---|---|
| 9,001,090 | B2* | 4/2015 | Sasanuma | G02F 1/134363 345/204 |
| 9,728,558 | B2* | 8/2017 | Shen | G02F 1/136286 |
| 10,657,909 | B2* | 5/2020 | Shimoshikiryoh | G09G 3/3614 |
| 2004/0125046 | A1 | 7/2004 | Yamazaki et al. | |
| 2004/0252098 | A1* | 12/2004 | Lee | G09G 3/3648 345/103 |
| 2007/0132684 | A1* | 6/2007 | Baek | G09G 3/3614 345/87 |
| 2007/0268231 | A1* | 11/2007 | Kang | G09G 3/3648 345/100 |
| 2008/0068523 | A1* | 3/2008 | Mitsui | G02F 1/133555 349/37 |
| 2010/0265410 | A1* | 10/2010 | Sugihara | G09G 3/3688 348/731 |
| 2010/0328259 | A1* | 12/2010 | Ishizaki | G06F 3/044 345/174 |
| 2012/0092241 | A1* | 4/2012 | Shang | G09G 3/3648 345/96 |
| 2012/0105425 | A1 | 5/2012 | Sasanuma et al. | |
| 2012/0200615 | A1 | 8/2012 | Tsubata | |
| 2012/0235979 | A1* | 9/2012 | Shibazaki | G09G 3/3648 345/212 |
| 2014/0293173 | A1* | 10/2014 | Koito | H04N 13/366 349/15 |
| 2015/0042693 | A1* | 2/2015 | Hirata | G09G 3/3614 345/690 |
| 2015/0170614 | A1* | 6/2015 | Sasanuma | G09G 5/18 345/213 |
| 2015/0192833 | A1* | 7/2015 | Ono | G02F 1/136213 349/41 |
| 2016/0178979 | A1* | 6/2016 | Kita | G02F 1/133621 349/33 |
| 2016/0299394 | A1* | 10/2016 | Yoshida | G02F 1/134363 |

FOREIGN PATENT DOCUMENTS

| | | |
|---|---|---|
| CN | 102576522 A | 7/2012 |
| CN | 104715730 A | 6/2015 |
| JP | H10-253987 A | 9/1998 |
| JP | 3789108 B2 | 6/2006 |
| WO | 2014/136586 A1 | 9/2014 |

* cited by examiner (a)

(b)

(a)

(b)

(a)

(b)

LIQUID CRYSTAL DISPLAY DEVICE AND DRIVING METHOD THEREFOR

TECHNICAL FIELD

The present invention relates to a liquid crystal display device and a driving method thereof.

BACKGROUND ART

Liquid crystal display panels have been having larger sizes and higher definitions. For example, in large-size high-definition liquid crystal display panels exceeding FHD, such as 4K and 8K, it is sometimes difficult to sufficiently secure the charge time (write time) for each pixel. For example, if a liquid crystal display panel which has a number rp of pixel rows is driven by a driving method in which gate bus lines (scan signal lines) connected with the respective pixel rows are sequentially selected in a one by one manner, the charge time for each pixel will be less than 1/rp of the vertical scanning period (frame period). To improve the display quality of, for example, moving images and stereoscopic images, the vertical scanning period has a tendency to be shortened. For example, liquid crystal display devices of 2x-speed driving or 4x-speed driving with respect to conventional liquid crystal display devices in which the vertical scanning period is 1/60 sec (vertical scanning frequency: 60 Hz), i.e., liquid crystal display devices in which the vertical scanning period is 1/120 sec or 1/240 sec, are in practical use.

Patent Document No. 1 and Patent Document No. 2 disclose driving methods wherein a display device which includes a plurality of source bus lines (data signal lines) corresponding to respective pixel columns is used such that the charge time for each pixel can be extended. For example, if two source bus lines are provided for each pixel column, switching elements can be concurrently turned on for two pixels which are to be supplied with display signal voltages from different source bus lines. Therefore, if the frame period is constant, the charge time for each pixel can be extended (e.g., doubled). The configuration of a display device which has two source bus lines for each pixel column is also referred to as "double source configuration".

In the driving method of Patent Document No. 1, two adjoining gate bus lines are concurrently selected in each horizontal scanning period and, in a certain horizontal scanning period and the next horizontal scanning period, only one gate bus line is repetitively selected. Each gate bus line is selected in two horizontal scanning periods. For example, in each frame period, the gate bus lines are scanned in a line by line progression: the gate bus lines of the first and second rows are selected in the first horizontal scanning period, the gate bus lines of the second and third rows are selected in the second horizontal scanning period, and the gate bus lines of the third and fourth rows are selected in the third horizontal scanning period. If the frame period is constant, the driving method of Patent Document No. 1 is capable of doubling the charge time for each pixel as compared with a driving method of a one by one line selection.

According to the driving method of FIG. 5 of Patent Document No. 2, two adjoining gate bus lines are concurrently selected in each horizontal scanning period, and no gate bus line is repetitively selected in different vertical scanning periods. For example, in each frame period, the gate bus lines are selected in a two by two manner: the gate bus lines of the first and second rows are selected in the first horizontal scanning period, the gate bus lines of the third and fourth rows are selected in the second horizontal scanning period, and the gate bus lines of the fifth and sixth rows are selected in the third horizontal scanning period. If the frame period is constant, the driving method of FIG. 5 of Patent Document No. 2 is capable of doubling the charge time for each pixel as compared with a driving method of a one by one line selection. Further, advantageously, the driving method of FIG. 5 of Patent Document No. 2 does not need a complicated control circuit as compared with the driving method of Patent Document No. 1.

CITATION LIST

Patent Literature

Patent Document No. 1: Japanese Patent No. 3789108
Patent Document No. 2: Japanese Laid-Open Patent Publication No. 10-253987

SUMMARY OF INVENTION

Technical Problem

However, according to the present inventors, display unevenness sometimes disadvantageously occurred in a liquid crystal display device to which the driving method of FIG. 5 of Patent Document No. 2 was applied. The present inventors conducted research and found that this display unevenness is attributed to such a driving method that the gate bus lines are selected in a two by two manner with a common scan signal voltage. Details will be described later.

The present invention was conceived for the purpose of solving the above-described problems. An object of the present invention is to provide a liquid crystal display device which is capable of suppressing occurrence of display unevenness which is attributed to such a driving method that the gate bus lines are selected in a group by group manner with a common scan signal voltage, and a driving method thereof.

Solution to Problem

A liquid crystal display device of an embodiment of the present invention includes: a plurality of pixels arranged in a matrix pattern having a plurality of rows and a plurality of columns, each of the pixels having a pixel electrode; a plurality of gate bus lines, each of the gate bus lines being associated with any of a plurality of pixel rows of the plurality of pixels; a plurality of source bus lines, each of the source bus lines being associated with any of a plurality of pixel columns of the plurality of pixels; and a plurality of TFTs, each of the TFTs being associated with any of the plurality of pixels, wherein the plurality of pixel rows include a plurality of pixel row groups, each of the pixel row groups including N pixel rows which adjoin one another in a column direction (N is an integer not less than 2), each of the plurality of pixel row groups being selected by a common scan signal voltage in each frame period, N pixel rows in each of the plurality of pixel row groups are associated with different ones of the source bus lines in a $p^{th}$ each pixel column, where, in each frame period, selected one of the pixel row groups is a $p^{th}$ group (p is an integer not less than 1), and two pixel rows of the plurality of pixel rows which adjoin each other in a column direction and which are included in different ones of the pixel row groups are a first pixel row and a second pixel row, the first pixel row includes a pixel which has one of the pixel electrodes capacitively coupled with one of the gate bus lines which is associated with the second pixel row, and when the first pixel row is included in a $q^{th}$ group (q is an integer not less than 1) and the second pixel row is included in a $(q+1)^{th}$ group, in each frame period, a scan signal voltage supplied to the gate bus lines which are associated with the $(q+1)^{th}$ group switches from low to high before a scan signal voltage supplied to the gate bus lines which are associated with the $q^{th}$ group switches from high to low.

In one embodiment, in each frame period, a polarity of a display signal voltage supplied to each of the plurality of source bus lines does not change.

In one embodiment, in each frame period, display signal voltages supplied to two of the plurality of source bus lines which adjoin each other have different polarities.

In one embodiment, the liquid crystal display device further includes a liquid crystal display panel, the liquid crystal display panel including a first substrate and a second substrate which oppose each other and a liquid crystal layer interposed between the first substrate and the second substrate, wherein the first substrate includes the pixel electrode, and the second substrate includes a counter electrode which is arranged so as to oppose the pixel electrode.

In one embodiment, the liquid crystal display device further includes a liquid crystal display panel, the liquid crystal display panel including a first substrate and a second substrate which oppose each other and a liquid crystal layer interposed between the first substrate and the second substrate, wherein the first substrate includes the pixel electrode and a common electrode which cooperates with the pixel electrode to produce a transverse electric field across the liquid crystal layer.

In one embodiment, the common electrode is closer to the liquid crystal layer than the pixel electrode is.

In one embodiment, the liquid crystal display device further includes a liquid crystal display panel, the liquid crystal display panel including a first substrate and a second substrate which oppose each other and a liquid crystal layer interposed between the first substrate and the second substrate, wherein the first substrate includes a first electrode provided in each of the plurality of pixels and a second electrode which cooperates with the first electrode to produce a transverse electric field across the liquid crystal layer, the second substrate includes a third electrode which is arranged so as to oppose the first electrode and the second electrode and which cooperates with the first electrode and the second electrode to produce a longitudinal electric field across the liquid crystal layer, and at least one of the first electrode and the second electrode is the pixel electrode.

In one embodiment, each of the plurality of pixels is capable of exhibiting, in a switchable manner, a black displaying state where black displaying is carried out with a longitudinal electric field produced across the liquid crystal layer, a white displaying state where white displaying is carried out with a transverse electric field produced across the liquid crystal layer, and a transparent displaying state where a rear surface side of the liquid crystal display panel is viewable through the liquid crystal display panel with no voltage applied across the liquid crystal layer.

In one embodiment, the plurality of TFTs include a plurality of first TFTs and a plurality of second TFTs, each of the plurality of first TFTs and the plurality of second TFTs being associated with any of the plurality of pixels, the plurality of source bus lines include a plurality of first source bus lines, each of which is connected with any of the plurality of first TFTs, and a plurality of second source bus lines, each of which is connected with any of the plurality of second TFTs, and N pixel rows included in each of the plurality of pixel row groups are, in each pixel column, associated with different ones of the first source bus lines and associated with different ones of the second source bus lines.

In one embodiment, in each frame period, a polarity of a display signal voltage supplied to one of the first source bus lines which is associated with a certain pixel is equal to a polarity of a display signal voltage supplied to one of the second source bus lines which is associated with the certain pixel.

In one embodiment, the liquid crystal display device further includes a lighting device which is capable of irradiating the liquid crystal display panel with light of a plurality of colors, including red light, green light and blue light, in a switchable manner, for color displaying in a field sequential fashion.

In one embodiment, the liquid crystal display panel does not include color filters.

In one embodiment, when viewed in a normal direction of the first substrate, the pixel electrode of the first pixel row overlaps with the gate bus line associated with the second pixel row.

In one embodiment, the pixel row group includes four or more pixel rows.

A liquid crystal display device driving method of an embodiment of the present invention is a driving method of a liquid crystal display device, the liquid crystal display device including a plurality of pixels arranged in a matrix pattern having a plurality of rows and a plurality of columns, each of the pixels having a pixel electrode; a plurality of gate bus lines, each of the gate bus lines being associated with any of a plurality of pixel rows of the plurality of pixels; a plurality of source bus lines, each of the source bus lines being associated with any of a plurality of pixel columns of the plurality of pixels; and a plurality of TFTs, each of the TFTs being associated with any of the plurality of pixels, wherein the plurality of pixel rows include a plurality of pixel row groups, each of the pixel row groups including N pixel rows which adjoin one another in a column direction (N is an integer not less than 2), N pixel rows in each of the plurality of pixel row groups are associated with different ones of the source bus lines in each pixel column, and where two pixel rows of the plurality of pixel rows which adjoin each other in a column direction and which are included in different ones of the pixel row groups are a first pixel row and a second pixel row, the first pixel row includes a pixel which has one of the pixel electrodes capacitively coupled with one of the gate bus lines which is associated with the second pixel row, the method including a step of (a) selecting each of the plurality of pixel row groups with a common scan signal voltage in each frame period, wherein where, in each frame period, a $p^{th}$ selected one of the pixel row groups is a $p^{th}$ group (p is an integer not less than 1), in step (a), when the first pixel row is included in a $q^{th}$ group (q is an integer not less than 1), the second pixel row is included in a $(q+1)^{th}$ group, and step (a) includes a step of supplying to the gate bus lines associated with the $(q+1)^{th}$ group a scan signal voltage which switches from low to high before a scan signal voltage supplied to the gate bus lines which are associated with the $q^{th}$ group switches from high to low.

In one embodiment, the method further includes a step of (b) supplying to each of the plurality of source bus lines a display signal voltage whose polarity does not change in each frame period.

In one embodiment, step (b) includes a step of supplying display signal voltages which have different polarities to two of the plurality of source bus lines which adjoin each other.

Advantageous Effects of Invention

According to an embodiment of the present invention, a liquid crystal display device which is capable of suppressing occurrence of display unevenness which is attributed to such a driving method that the gate bus lines are selected in a group by group manner with a common scan signal voltage and a driving method thereof are provided.

BRIEF DESCRIPTION OF DRAWINGS

FIG. 3(a) is an example of a plan view schematically showing the liquid crystal display device 100. FIG. 3(b) is a schematic cross-sectional view of a TFT substrate 10 taken along line 3B-3B' of FIG. 3(a).

FIG. 5(a) is another example of a plan view schematically showing the liquid crystal display device 100. FIG. 5(b) is a schematic cross-sectional view of the TFT substrate 10 taken along line 5B-5B' of FIG. 5(a).

FIG. 18(a) is an example of a plan view schematically showing the liquid crystal display device 300. FIG. 18(b) is a schematic cross-sectional view of the rear substrate 10 taken along line 18B-18B' of FIG. 18(a).

FIG. 20(a) is another example of a plan view schematically showing the liquid crystal display device 300. FIG. 20(b) is a schematic cross-sectional view of the rear substrate 10 taken along line 20B-20B' of FIG. 20(a).

FIG. 21(a) is a plan view schematically showing the TFT substrate 10 of the liquid crystal display device 100. FIG. 21(b) is a plan view schematically showing a counter substrate 30 of the liquid crystal display device 100. FIG. 21(c) is a plan view schematically showing the rear substrate 10 of the liquid crystal display device 300. FIG. 21(d) is a plan view schematically showing the front substrate 30 of the liquid crystal display device 300.

DESCRIPTION OF EMBODIMENTS

Figure 1:
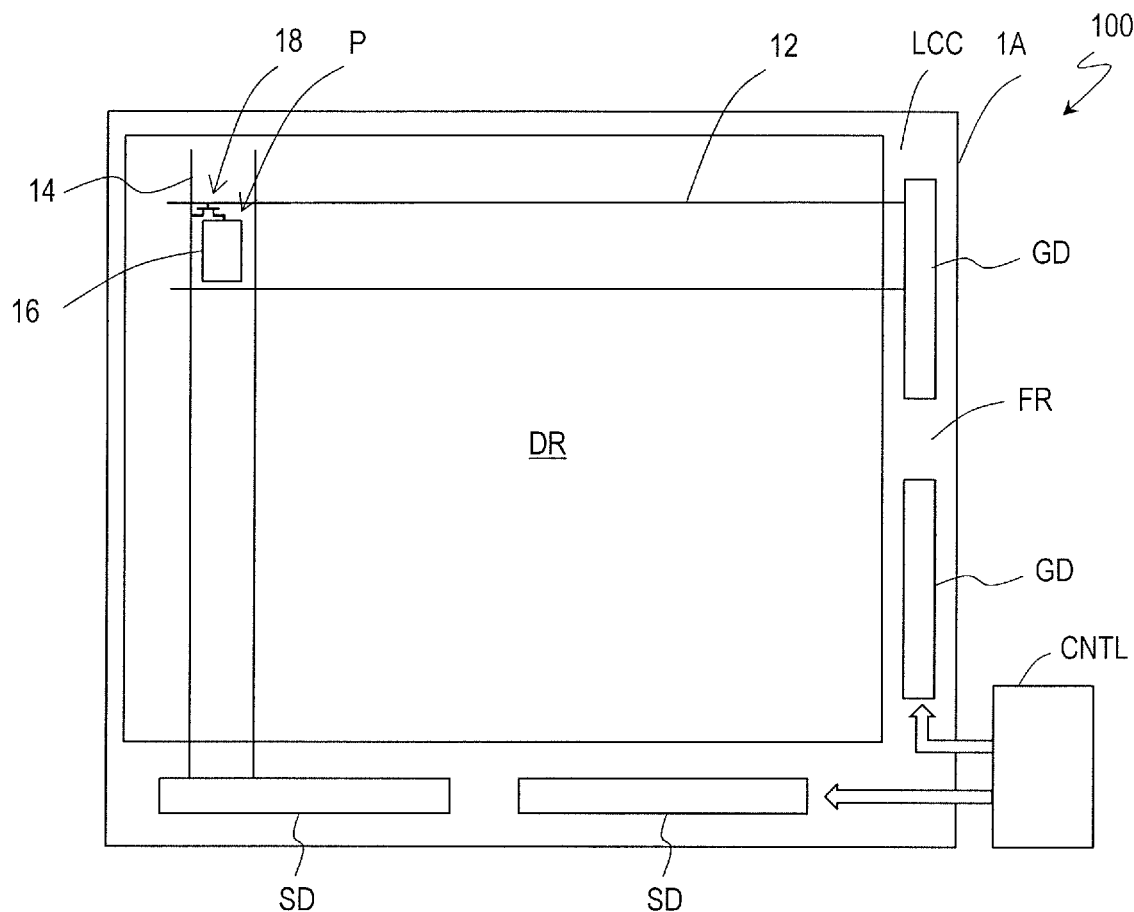
FIG. 1(a) is a diagram schematically showing a liquid crystal display device 100 of Embodiment 1 of the present invention.
FIG. 1(b) is cross-sectional view schematically showing a portion corresponding to a single pixel of a liquid crystal display panel 1A of the liquid crystal display device 100.
Figure 1:
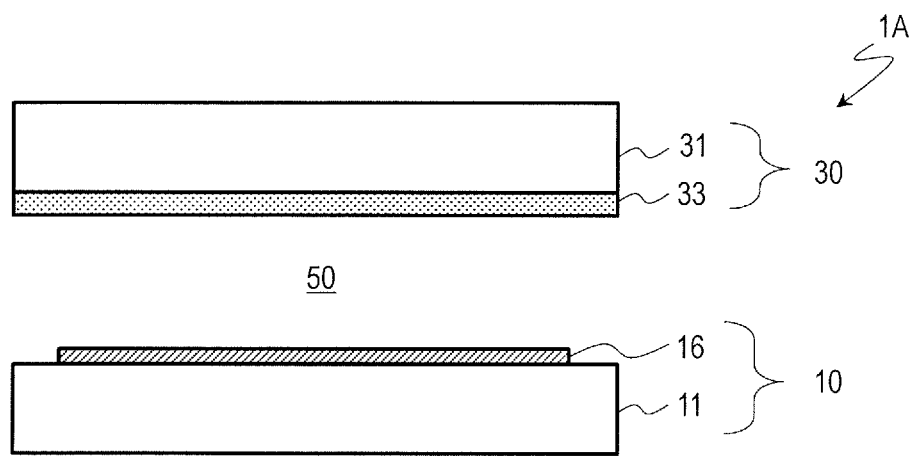

Hereinafter, a liquid crystal display device and a driving method thereof according to embodiments of the present invention are described with reference to the drawings. The present invention is not limited to the embodiments illustrated below. In the drawings mentioned below, components which have substantially the same functions are designated with common reference numerals, and the descriptions thereof are sometimes omitted.

Embodiment 1

A liquid crystal display device 100 of Embodiment 1 of the present invention is described with reference to FIG. 1 to FIG. 4. The liquid crystal display device of Embodiment 1 is a liquid crystal display device of a longitudinal electric field mode (e.g., VA (Vertical Alignment) mode or TN (Twisted Nematic) mode).

Figure 2:
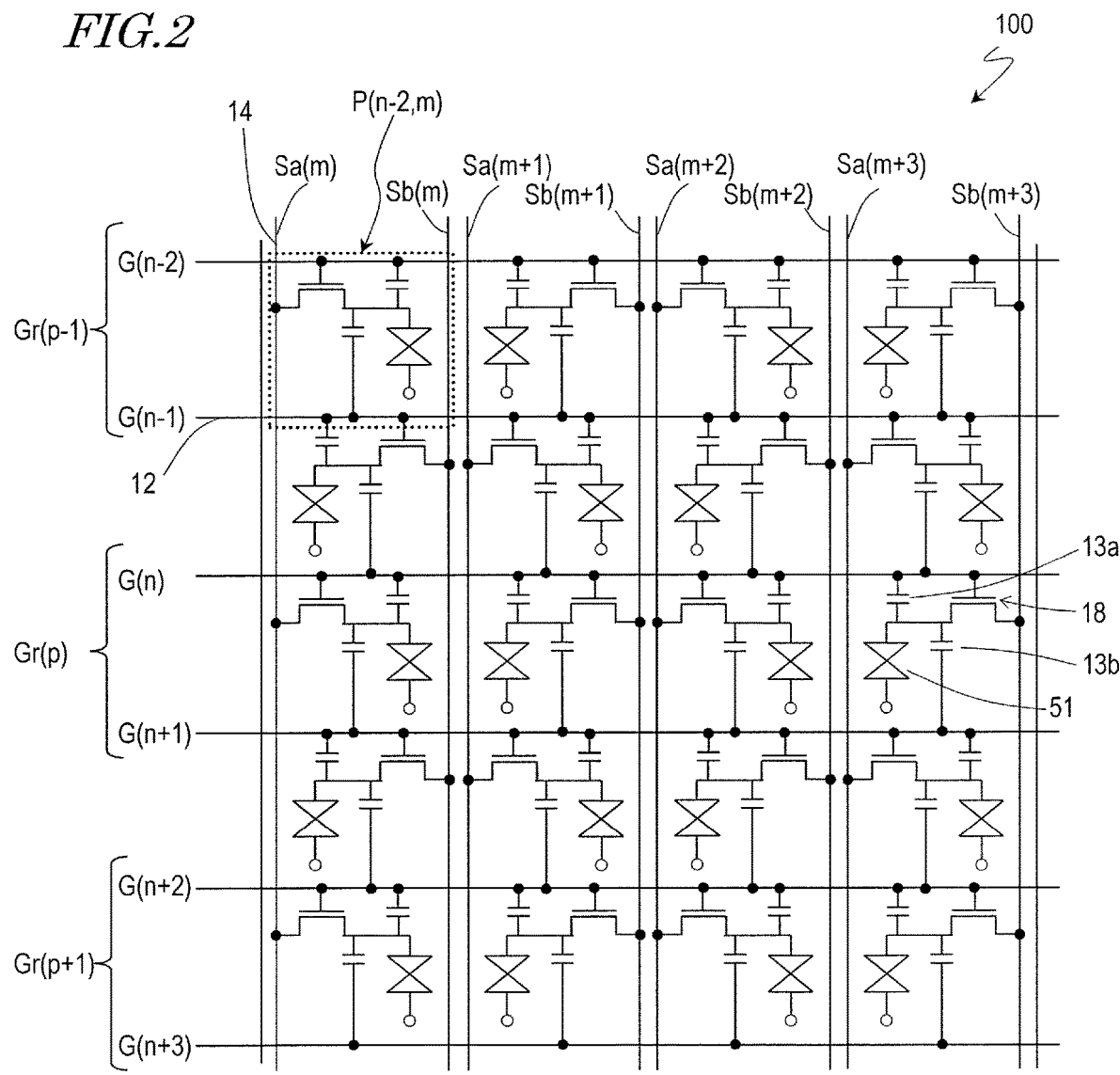
FIG. 2 is a diagram schematically showing an equivalent circuit (for 20 pixels in 5 rows and 4 columns) of the liquid crystal display device 100.

First, see FIG. 1 and FIG. 2. FIG. 1(a) is a diagram schematically showing the liquid crystal display device 100. FIG. 1(b) is cross-sectional view schematically showing a portion corresponding to a single pixel of a liquid crystal display panel 1A of the liquid crystal display device 100. FIG. 2 is a diagram schematically showing an equivalent circuit (for 20 pixels in 5 rows and 4 columns) of the liquid crystal display device 100.

As shown in FIG. 1(a), the liquid crystal display device 100 includes the liquid crystal display panel 1A. As schematically shown in FIG. 1(a), the liquid crystal display device 100 includes a control circuit CNTL, a power supply circuit (not shown), etc. When the liquid crystal display device 100 is a transmissive liquid crystal display device, the liquid crystal display device 100 further includes a backlight (not shown).

As shown in FIG. 1(b), the liquid crystal display panel LA includes a first substrate 10 and a second substrate 30, which oppose each other, and a liquid crystal layer 50 provided between the first substrate 10 and the second substrate 30. The first substrate 10 includes a first transparent substrate (for example, glass substrate) 11 and a pixel electrode 16 provided on the first transparent substrate 11. The pixel electrode 16 is provided for each of a plurality of pixels of the liquid crystal display device 100. The second substrate 30 includes a second transparent substrate (for example, glass substrate) 31 and a counter electrode 33 that is provided on the second transparent substrate 31 so as to oppose the pixel electrode 16.

In the present embodiment, in the following description, the first substrate 10 is also referred to as "TFT substrate", and the second substrate 30 is also referred to as "counter substrate". When necessary, on the liquid crystal layer 50 side of the pixel electrode 16, a protection film and an alignment film (both not shown) are provided. On the liquid crystal layer 50 side of the counter electrode 33, for example, an alignment film (not shown) can be provided. Between the second transparent substrate 31 and the counter electrode 33, for example, a color filter layer (not shown) can be provided. A liquid crystal display panel of a longitudinal electric field mode of an embodiment of the present invention is broadly applicable to known longitudinal electric field mode liquid crystal display panels.

As shown in FIG. 1(a), the liquid crystal display panel 1A includes a liquid crystal display cell LCC and a driving circuit which includes a gate driver GD and a source driver SD. The liquid crystal display panel 1A has a display region DR demarcated by pixels P arranged in a matrix and a frame region FR provided around the display region DR. The frame region FR does not contribute to displaying. For example, the driving circuit may be mounted as a driver IC in the frame region FR of the TFT substrate 10. Alternatively, a part or the entirety of the driving circuit may be monolithically formed in the frame region FR of the TFT substrate 10.

As shown in FIG. 2, the liquid crystal display device 100 includes a plurality of pixels arranged in a matrix pattern having a plurality of rows and a plurality of columns, a plurality of gate bus lines 12, a plurality of source bus lines 14, and a plurality of TFTs 18. As previously described, each of the plurality of pixels includes a pixel electrode 16.

Where the number of pixel rows in the liquid crystal display device 100 is rp and the number of pixel columns in the liquid crystal display device 100 is cq, the plurality of pixels are arranged in a matrix (rp, cq) of rows (1 to rp) and columns (1 to cq). Each pixel is also represented as pixel P(p, q) (where $1 \leq p \leq rp$, $1 \leq q \leq cq$). A pixel row refers to a plurality of pixels aligned in a row direction. A pixel column refers to a plurality of pixels aligned in a column direction.

Each of the plurality of TFTs 18 is associated with any of the plurality of pixels. For example, each pixel is connected with a TFT 18. The TFT 18 may be a known TFT, such as amorphous silicon TFT (a-Si TFT), polysilicon TFT (p-Si TFT), microcrystalline silicon TFT (μC-Si TFT), or may be a TFT which includes an oxide semiconductor layer (oxide TFT). The oxide TFT is a TFT which includes an active layer that contains an oxide semiconductor such as, for example, In—Ga—Zn—O based semiconductor.

Each of the plurality of gate bus lines 12 is associated with any of the plurality of pixels. Typically, each pixel row is associated with any of the gate bus lines 12. A gate bus lines 12 associated with the $n^{th}$ pixel row is also referred to as "gate bus line G(n)". The gate bus line G(n) is connected with the gate electrodes 12g of the TFTs 18 of the $n^{th}$ pixel row (see FIG. 3).

Each of the plurality of source bus lines 14 is associated with any of the plurality of pixels. As shown in FIG. 2, each pixel column is associated with any two of the source bus lines 14. That is, the liquid crystal display device 100 has a double source configuration. Source bus lines 14 associated with the $m^{th}$ pixel column are also referred to as "source bus lines Sa(m) and Sb(m)". In the drawing, a source bus line on the left side of the pixels is referred to as "source bus line Sa(m)", and a source bus line on the right side of the pixels is referred to as "source bus line Sb(m)". The source bus lines Sa(m) and Sb(m) are connected with the source electrodes 14s of the TFTs 18 of the $m^{th}$ pixel column (see FIG. 3).

The control circuit CNTL receives input display signals which are indicative of grayscale levels which are to be exhibited by the plurality of pixels P and generates scan signal voltages (gate signal voltages) and display signal voltages (source signal voltages). The control circuit CNTL supplies the scan signal voltage to the gate driver GD and supplies the display signal voltage to the source driver SD. The plurality of gate bus lines 12 are supplied with the scan signal voltage from the gate driver GD. The plurality of source bus lines 14 are supplied with the display signal voltage from the source driver SD.

Figure 5:
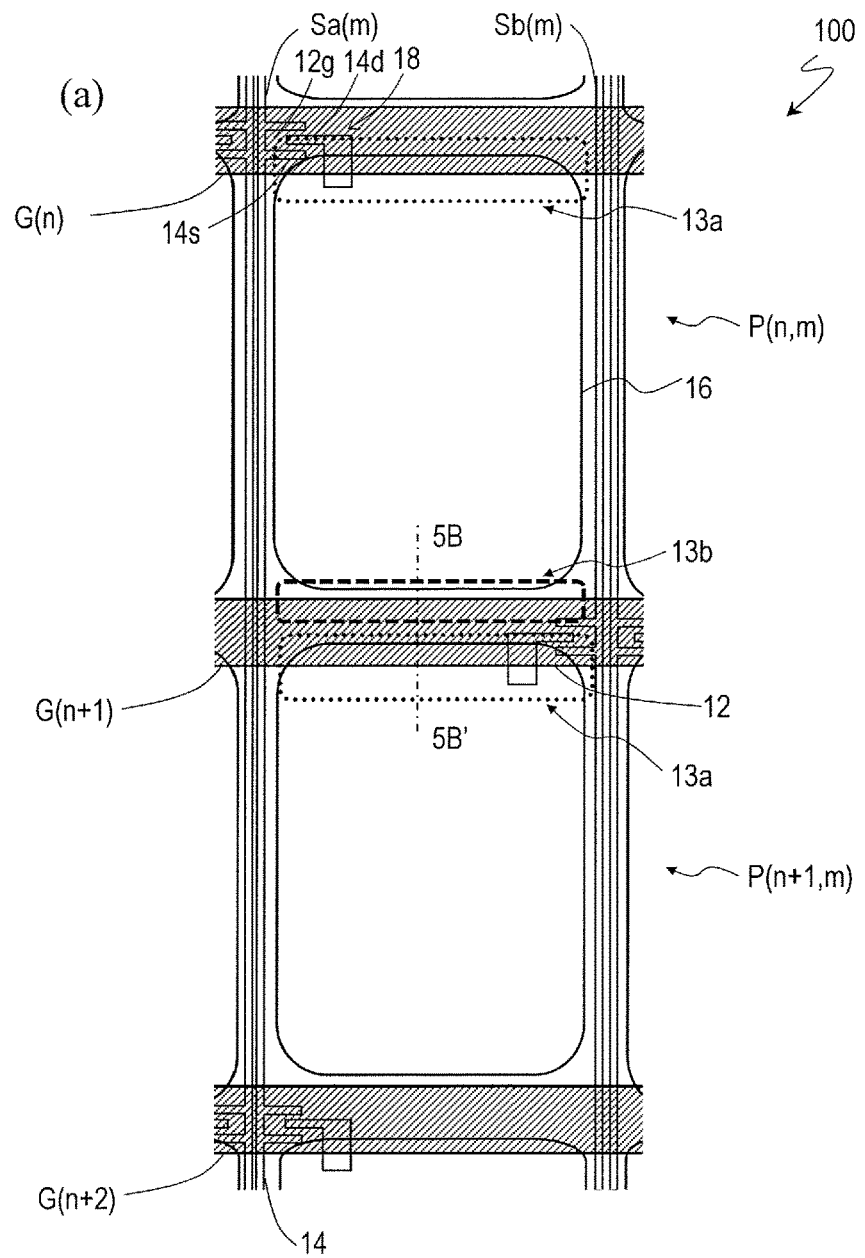
FIG. 5 is for illustrating another example of the configuration (pixel structure) in which the first capacitor 13a and the second capacitor 13b are formed.
Figure 5:
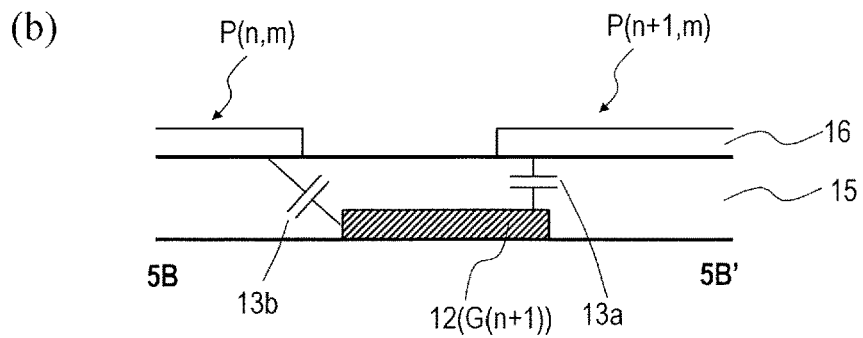

The driving method in which the gate bus lines are selected in a group by group manner with a common scan signal voltage, i.e., the driving method of FIG. 5 of Patent Document No. 2, advantageously does not need a complicated control circuit as compared with the driving method of Patent Document No. 1. For example, a gate driver for use in such a driving method that N pixel rows are selected in a one by one manner can be used in such a driving method that (2×N) pixel rows are selected in a two by two manner.

Each of the plurality of pixels has a liquid crystal capacitor. In an electrical equivalent circuit, the liquid crystal capacitor of each pixel is represented as "liquid crystal capacitor 51". The liquid crystal capacitor 51 is formed by the pixel electrode 16, the liquid crystal layer 50 and the counter electrode 33. When the liquid crystal capacitor 51 is mentioned as an electrical component, it is also referred to as "liquid crystal capacitor Clc".

Between the pixel electrode 16 of each pixel and a gate bus line 12 which is associated with that pixel (hereinafter, also referred to as "corresponding gate bus line"), a parasitic capacitor 13a is formed. That is, the pixel electrode 16 is capacitively coupled with the corresponding gate bus line 12 via the parasitic capacitor 13a. Also, between the pixel electrode 16 of each pixel and a gate bus line 12 which is associated with a pixel adjoining that pixel in the column direction (hereinafter, also referred to as "non-corresponding gate bus line"), a parasitic capacitor 13b is formed. That is, the pixel electrode 16 is also capacitively coupled with the non-corresponding gate bus line 12 via the parasitic capacitor 13b. Hereinafter, the parasitic capacitor 13a between the pixel electrode 16 and the corresponding gate bus line 12 is also referred to as "the first capacitor 13a", and the parasitic capacitor 13b between the pixel electrode 16 and the non-corresponding gate bus line 12 is also referred to as "the second capacitor 13b". As seen from FIG. 2, the first capacitor 13a and the second capacitor 13b can be regarded as capacitive elements which are coupled electrically in parallel with the liquid crystal capacitor 51.

Figure 3:
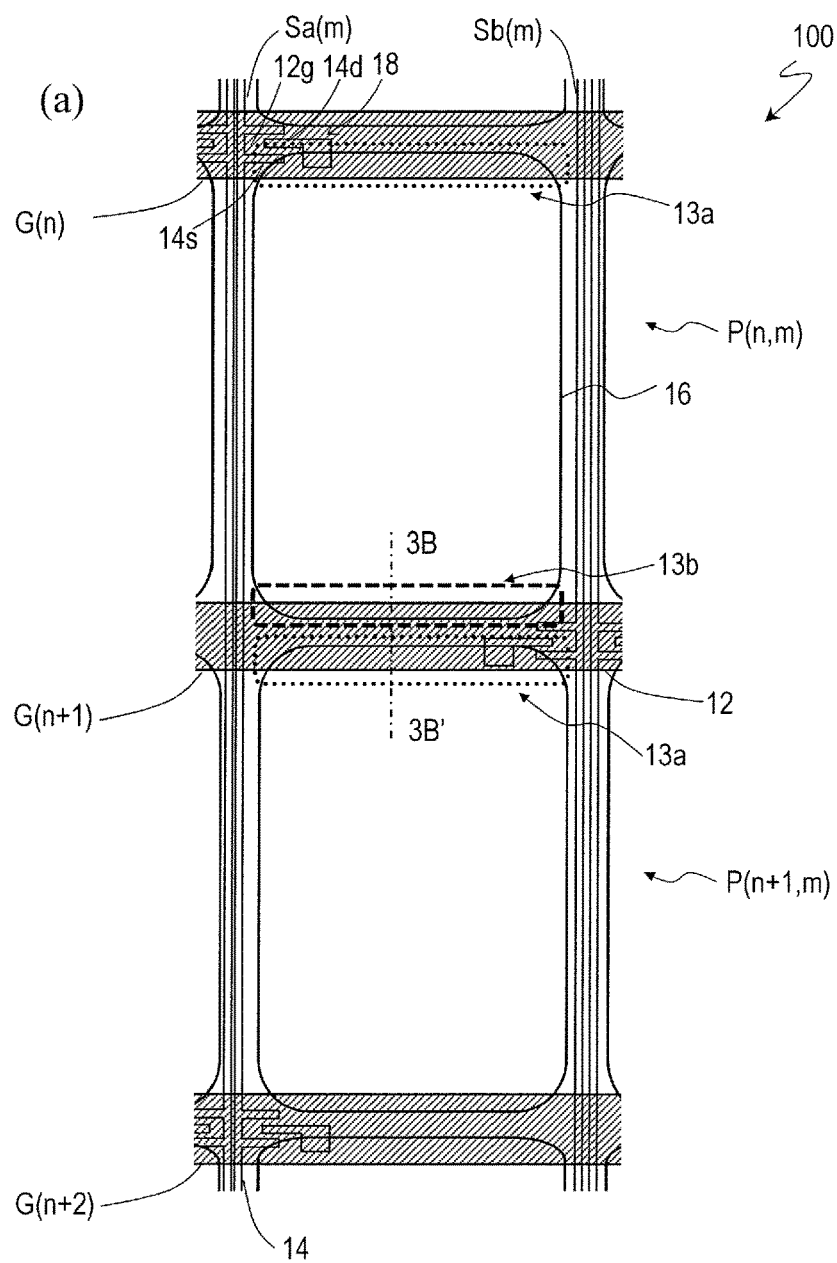
FIG. 3 illustrates an example of the configuration (pixel structure) in which a first capacitor 13a and a second capacitor 13b are formed.
Figure 3:
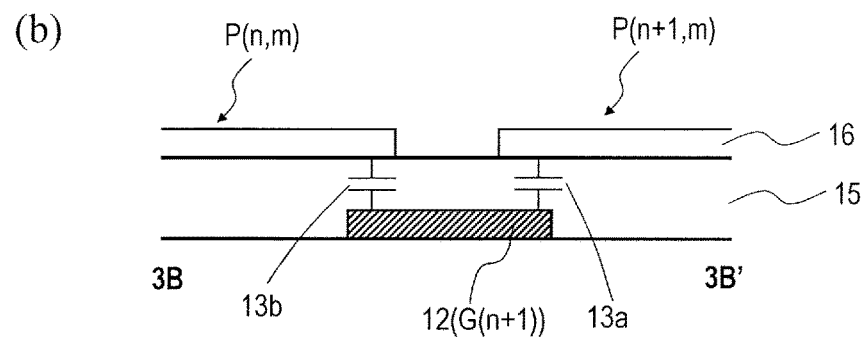

An example of the configuration (pixel structure) where the first capacitor 13a and the second capacitor 13b are formed is shown in FIG. 3. FIG. 3(a) is an example of a plan view schematically showing the liquid crystal display device 100. FIG. 3(b) is a schematic cross-sectional view of the TFT substrate 10 taken along line 3B-3B' of FIG. 3(a).

As shown in FIG. 3(a), when viewed in a normal direction of the TFT substrate 10, the pixel electrode 16 of the pixel P(n, m) overlaps with the gate bus line G(n) that is associated with the $n^{th}$ pixel row. Likewise, when viewed in a normal direction of the TFT substrate 10, the pixel electrode 16 of the pixel P(n+1, m) overlaps with the gate bus line G(n+1). As shown in FIG. 3(b), the first capacitor 13a is formed by, for example, the pixel electrode 16 of the $(n+1)^{th}$ pixel row, the gate bus line G(n+1), and an insulating layer 15 provided between the pixel electrode 16 and the gate bus line G(n+1).

When viewed in a normal direction of the TFT substrate 10, the pixel electrode 16 of the pixel P(n, m) overlaps with the gate bus line G(n+1) that is associated with the $(n+1)^{th}$ pixel row. As shown in FIG. 3(b), the second capacitor 13b is formed by, for example, the pixel electrode 16 of the $n^{th}$ pixel row, the gate bus line G(n+1), and the insulating layer 15 provided between the pixel electrode 16 and the gate bus line G(n+1).

When the first capacitor 13a and the second capacitor 13b are mentioned as electrical components, they are also referred to as "first capacitor Cca" and "second capacitor Ccb", respectively.

Figure 4:
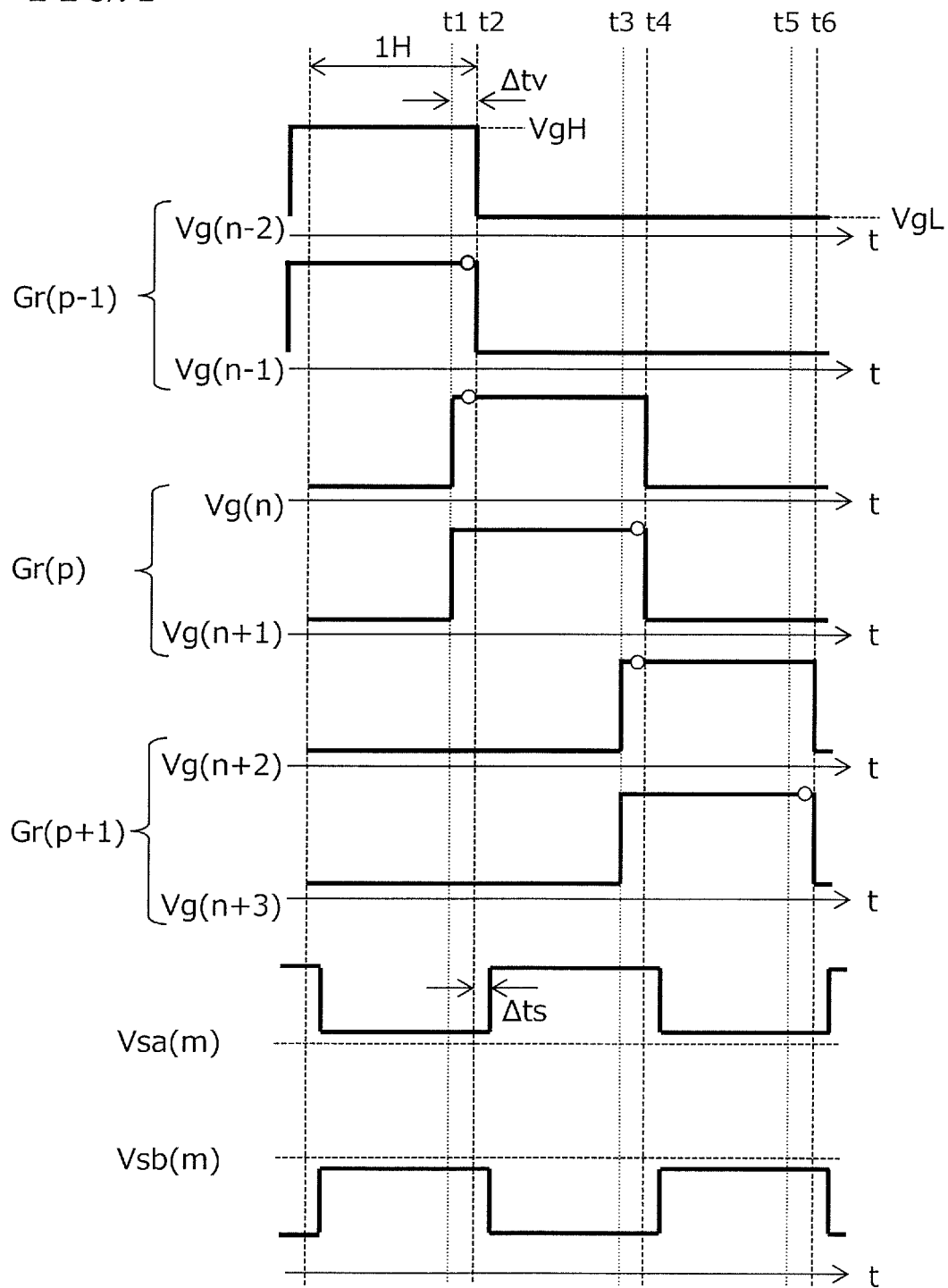
FIG. 4 is a diagram showing the waveforms of scan signal voltages Vg and display signal voltages Vs used in driving the liquid crystal display device 100.

Next, refer to FIG. 4. FIG. 4 is a diagram showing the waveforms of scan signal voltage Vg and display signal voltage Vs used in driving the liquid crystal display device 100.

The plurality of pixel rows include a plurality of pixel row groups. Herein, two pixel rows adjoining each other in a column direction constitute a pixel row group. As shown in FIG. 4, in each frame period, each of the plurality of pixel row groups is selected by a common scan signal voltage. Pixel rows included in different pixel row groups do not overlap. In each frame period, the $p^{th}$ selected pixel row group is referred to as the $p^{th}$ group Gr(p). For example, the $p^{th}$ group Gr(p) is selected in the $p^{th}$ horizontal scanning period in each frame period.

The example illustrated in the drawings is now specifically described. As shown in FIG. 2 and FIG. 4, the $(p-1)^{th}$ group Gr(p-1) includes the $(n-2)^{th}$ pixel row and the $(n-1)^{th}$ pixel row. The $(p-1)^{th}$ group Gr(p-1) is associated with the gate bus line G(n-2) and the gate bus line G(n-1) which are associated with these pixel rows. The $p^{th}$ group Gr(p) includes the $n^{th}$ pixel row and the $(n+1)^{th}$ pixel row. The $p^{th}$ group Gr(p) is associated with the gate bus line G(n) and the gate bus line G(n+1) which are associated with these pixel rows. The $(p+1)^{th}$ group Gr(p+1) includes the $(n+2)^{th}$ pixel row and the $(n+3)^{th}$ pixel row. The $(p+1)^{th}$ group Gr(p+1) is associated with the gate bus line G(n+2) and the gate bus line G(n+3) which are associated with these pixel rows.

In the liquid crystal display device 100, each pixel row group is selected by supplying a common scan signal voltage to two gate bus lines which are associated with that pixel row group. That is, scan signal voltages supplied to gate bus lines associated with each pixel row group are identical.

In each pixel column, two pixel rows included in each of the plurality of pixel row groups are associated with different source bus lines. Thus, even when two pixel rows included in each pixel row group are concurrently selected, different display signal voltages can be supplied to these pixel rows.

In each frame period, the liquid crystal display device 100 is driven such that the scan signal voltage supplied to the gate bus lines G(n+2) and G(n+3) that are associated with the $(p+1)^{th}$ group Gr(p+1) switches from VgL (low) to VgH (high) before the scan signal voltage supplied to the gate bus lines G(n) and G(n+1) that are associated with the $p^{th}$ group Gr(p) switches from VgH (high) to VgL (low). With this arrangement, occurrence of display unevenness which is attributed to the driving method of FIG. 5 of Patent Document No. 2, i.e., the driving method in which the gate bus lines are selected in a group by group manner with a common scan signal voltage, can be suppressed.

The "frame period (vertical scanning period)" means a time period from a point when a gate bus line (scan line) is selected to a point when the same gate bus line is selected next time. Note that, in each frame period (vertical scanning period), the difference (period) between a point in time when one gate bus line is selected and a point in time when the next gate bus line is selected is referred to as one horizontal scanning period (1H).

Figure 23:
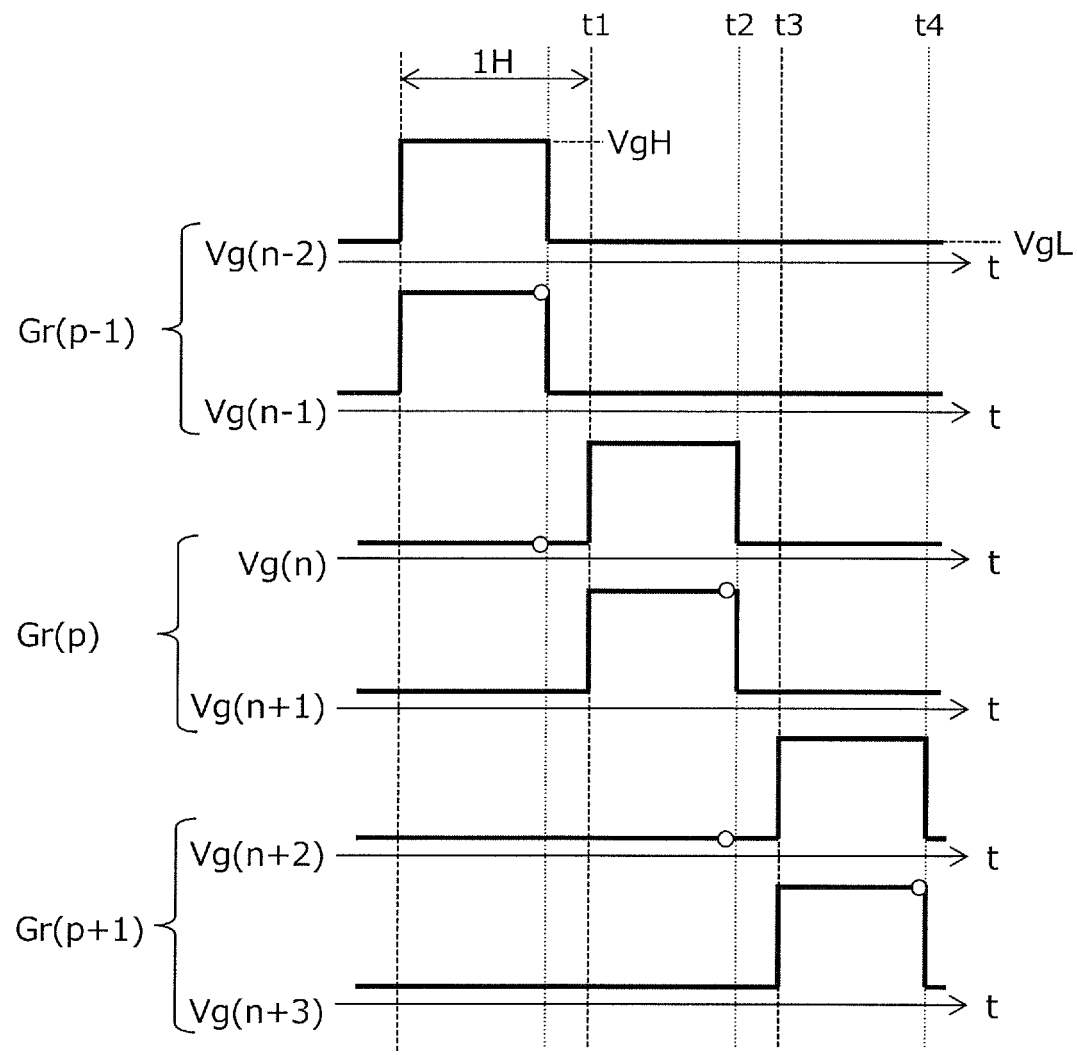
FIG. 23 is a diagram showing the waveforms of scan signal voltages Vg used in the driving method of Comparative Example 1.

Now, display unevenness which can occur in a liquid crystal display device to which the driving method of FIG. 5 of Patent Document No. 2 (hereinafter, also referred to as "the driving method of Comparative Example 1") is applied is described with reference to FIG. 23. Herein, a liquid crystal display device which has the same configuration as that shown in FIG. 1 and FIG. 2 and which is driven using the voltages shown in FIG. 23 is described as an example. Thus, the descriptions of the configuration of the liquid crystal display device 100 and the driving method of the above-described embodiment also apply to the configuration of the liquid crystal display device to which the driving method of Comparative Example 1 is applied and the driving method. The driving method of the liquid crystal display device 100 of the embodiment is similar to the driving method of Comparative Example 1 in that the gate bus lines are selected in a group by group manner with a common scan signal voltage and, therefore, the description of the similar feature will be omitted.

FIG. 23 is a diagram showing the waveform of scan signal voltage Vg used in the driving method of Comparative Example 1. In the following description, for the sake of simplicity, all of the pixels display an intermediate grayscale level.

By applying scan signal voltages Vg of FIG. 23, as will be described below, the potential of a gate bus line which forms the second capacitor Ccb of each pixel immediately before the TFT 18 of that pixel switches from an ON state to an OFF state differs among the pixel rows. It is found that this is attributed to the display unevenness. In FIG. 23, open circles represent the potential of a gate bus line which forms the second capacitor Ccb of each pixel immediately before the TFT 18 of that pixel switches from an ON state to an OFF state.

See the $p^{th}$ group Gr(p). As previously described, the $p^{th}$ group Gr(p) is associated with the gate bus line G(n) and the gate bus line G(n+1), and a common scan signal voltage is supplied to the gate bus line G(n) and the gate bus line G(n+1). That is, scan signal voltages Vg(n) and Vg(n+1) have a common waveform.

At time t1, scan signal voltages Vg(n) and Vg(n+1) concurrently change from VgL (low) to VgH (high) to turn the TFTs 18 of the $n^{th}$ and $(n+1)^{th}$ pixel rows into in a conducting state (ON state) concurrently. As a result, the pixel electrodes 16 are supplied with display signal voltages from different source bus lines 14 so that the liquid crystal capacitors Clc are charged. See the $m^{th}$ pixel column. For example, as shown in FIG. 2, the pixel electrode 16 of the pixel P(n, m) is supplied with a display signal voltage from the source bus line Sa(m), and the pixel electrode 16 of the pixel P(n+1, m) is supplied with a display signal voltage from the source bus line Sb(m). Likewise, the first capacitor Cca and the second capacitor Ccb of each pixel are supplied with a display signal voltage from a source bus line 14 which is associated with that pixel and charged.

At time t2, scan signal voltages Vg(n) and Vg(n+1) concurrently change from VgH (high) to VgL (low). Accordingly, the TFTs 18 of the $n^{th}$ and $(n+1)^{th}$ pixel rows turn into a non-conducting state (OFF state) concurrently, and the liquid crystal capacitor Clc, the first capacitor Cca and the second capacitor Ccb are all electrically isolated from the source bus line 14.

Immediately after time t2, due to a feedthrough phenomenon which is attributed to the influence of the first capacitor Cca, the voltage of the pixel electrode 16 decreases by the magnitude of the feedthrough voltage. Feedthrough voltage ΔVa which is attributed to the influence of the first capacitor Cca is expressed by the following formula:

$$\Delta Va = (VgH - VgL) \times CCA/Cpix$$

where VgH and VgL are the values of the scan signal voltage at ON state and OFF state, respectively, of the TFT, CCA is the electrostatic capacitance value of the first capacitor Cca, and Cpix is the electrostatic capacitance value of the pixel capacitor. In this specification, "x" means multiplication. The pixel capacitor includes the liquid crystal capacitor Clc, the first capacitor Cca and the second capacitor Ccb. For example, when the other capacitors than the first capacitor Cca and the second capacitor Ccb (parasitic capacitor and storage capacitor) are not considered, Cpix=CLC(V)+CCA+CCB. Here, CCB is the electrostatic capacitance value of the second capacitor Ccb, and CLC(V) is the electrostatic capacitance value of the liquid crystal capacitor Clc. The value of CLC(V) depends on the effective voltage (V) applied across the liquid crystal layer of each pixel. The pixel capacitor can further include a capacitor other than the first capacitor Cca and the second capacitor Ccb (parasitic capacitor and/or storage capacitor). Since the first capacitor Cca and the second capacitor Ccb mainly contribute to occurrence of display unevenness which will be described below, the other capacitors than these capacitors are not considered herein.

There is a probability that not only feedthrough voltage ΔVa which is attributed to the influence of the first capacitor Cca but also feedthrough voltage ΔVb which is attributed to the influence of the second capacitor Ccb will contribute to the voltage of the pixel electrode 16. The point to be considered is that the feedthrough phenomenon which is attributed to the influence of the first capacitor Cca is common among the respective pixel rows, but the feedthrough phenomenon which is attributed to the influence of the second capacitor Ccb can differ among the pixel rows.

See the $n^{th}$ pixel row. The pixel electrode 16 of the $n^{th}$ pixel row is capacitively coupled with the gate bus line G(n+1) via the second capacitor Ccb. Immediately before time t2, scan signal voltage Vg(n+1) supplied to the gate bus line G(n+1) is VgH (high). At time t2, scan signal voltage Vg(n+1) changes from VgH (high) to VgL (low). Immediately after time t2, due to the feedthrough phenomenon which is attributed to the influence of the second capacitor Ccb, the voltage of the pixel electrode 16 decreases by the magnitude of feedthrough voltage ΔVb. Feedthrough voltage ΔVb which is attributed to the influence of the second capacitor Ccb is expressed by the following formula:

$$\Delta Vb = (VgH - VgL) \times CCB/Cpix.$$

Voltage Vl(n) of the pixel electrode 16 of the $n^{th}$ pixel row is expressed by:

$$Vl(n) = Vs - \Delta Va - \Delta Vb$$

where Vs is the display signal voltage supplied from the source bus line 14.

Meanwhile, in the $(n+1)^{th}$ pixel row, the feedthrough phenomenon which is attributed to the influence of the second capacitor Ccb scarcely contributes to the displayed grayscale level.

See the $(n+1)^{th}$ pixel row. The pixel electrode 16 of the $(n+1)^{th}$ pixel row is capacitively coupled with the gate bus line G(n+2) via the second capacitor Ccb. Immediately before time t2, scan signal voltage Vg(n+2) supplied to the gate bus line G(n+2) is VgL (low). Signal voltage Vg(n+2) does not change at time t2.

After time t2, scan signal voltage Vg(n+2) changes from VgL (low) to VgH (high) at time t3. Accordingly, immediately after time t3, the feedthrough voltage which is attributed to the influence of the second capacitor Ccb occurs. However, at time t4, scan signal voltage Vg(n+2) returns from VgH (high) to VgL (low) and, therefore, the influence of the feedthrough voltage occurring immediately after time t3 is canceled.

Thus, voltage Vl(n+1) of the pixel electrode 16 of the $(n+1)^{th}$ pixel row is expressed by:

$$Vl(n+1) = Vs - \Delta Va.$$

Voltage Vl(n+1) of the pixel electrode 16 of the $(n+1)^{th}$ pixel row is greater than voltage Vl(n) of the pixel electrode 16 of the $n^{th}$ pixel row. Therefore, the brightness of the $(n+1)^{th}$ pixel row is different from the brightness of the $n^{th}$ pixel row. That is, the display luminances of the $n^{th}$ and $(n+1)^{th}$ pixel rows are different from each other. Therefore, it is visually perceived as display unevenness.

Thus, in a liquid crystal display device to which the driving method of Comparative Example 1 is applied, the influence of the feedthrough voltage which is attributed to the second capacitor Ccb differs among the pixel rows, and this difference can cause display unevenness. As represented by open circles in FIG. 23, the potential of a gate bus line which forms the second capacitor Ccb of each pixel immediately before the TFT 18 of that pixel switches from an ON state to an OFF state differs among the pixel rows. This is attributed to occurrence of display unevenness. In the foregoing description, for the sake of simplicity, all of the pixels display an intermediate grayscale level although, as a matter of course, occurrence of display unevenness is not limited to this case.

Figure 24:
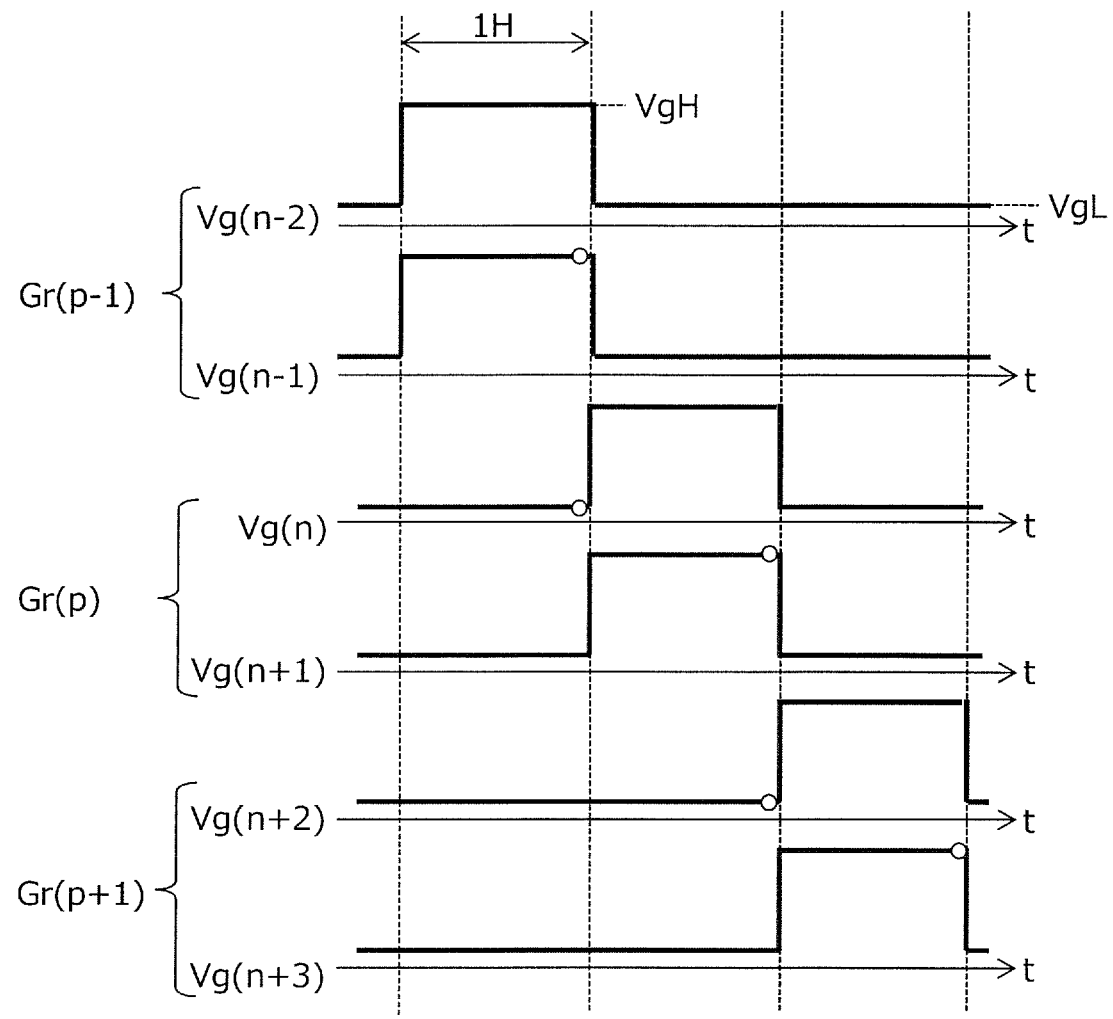
FIG. 24 is a diagram showing the waveforms of scan signal voltages Vg used in the driving method of Comparative Example 2.

Occurrence of display unevenness is not limited to a liquid crystal display device to which the driving method of Comparative Example 1 is applied. FIG. 24 shows the waveform of scan signal voltage Vg used in the driving method of Comparative Example 2.

The driving method of Comparative Example 2 shown in FIG. 24 is different from the driving method of Comparative Example 1 shown in FIG. 23 in that the scan signal voltage supplied to the gate bus lines G(n+2) and G(n+3) that are associated with the $(p+1)^{th}$ group Gr(p+1) switches from VgL (low) to VgH (high) concurrently with switching from VgH (high) to VgL (low) of the scan signal voltage supplied to the gate bus lines G(n) and G(n+1) that are associated with the $p^{th}$ group Gr(p). Also in a liquid crystal display device to which the driving method of Comparative Example 2 is applied, the cause of occurrence of display unevenness in every other pixel row is the same as that previously described with reference to FIG. 23.

Next, it is explained with reference again to FIG. 4 that the liquid crystal display device 100 of the embodiment of the present invention is capable of suppressing occurrence of display unevenness which has been described above.

As illustrated in FIG. 4, the liquid crystal display device 100 is different from the liquid crystal display devices to which the driving methods of Comparative Example 1 and Comparative Example 2 are applied in that the scan signal voltage supplied to the gate bus lines G(n+2) and G(n+3) that are associated with the $(p+1)^{th}$ group Gr(p+1) switches from VgL (low) to VgH (high) before switching from VgH (high) to VgL (low) of the scan signal voltage supplied to the gate bus lines G(n) and G(n+1) that are associated with the $p^{th}$ group Gr(p). In FIG. 4, open circles represent the potential of a gate bus line which forms the second capacitor Ccb of each pixel immediately before the TFT 18 of that pixel switches from an ON state to an OFF state.

See again the $p^{th}$ group Gr(p).

At time t1, scan signal voltages Vg(n) and Vg(n+1) concurrently change from VgL (low) to VgH (high). Here, time t1 is precedent to time t2 (t1<t2). Time t2 is the time when scan signal voltages Vg(n−2) and Vg(n−1) supplied to the gate bus lines G(n−2) and G(n−1) that are associated with the $(p-1)^{th}$ group Gr(p−1) switch from VgH (high) to VgL (low).

At time t4, scan signal voltages Vg(n) and Vg(n+1) concurrently change from VgH (high) to VgL (low).

Immediately after time t4, due to the feedthrough phenomenon which is attributed to the influence of the first capacitor Cca, the voltage of the pixel electrode decreases by the magnitude of the feedthrough voltage. Feedthrough voltage ΔVa which is attributed to the influence of the first capacitor Cca is expressed by the following formula:

$$\Delta Va = (VgH - VgL) \times CCA/Cpix.$$

Next, feedthrough voltage ΔVb which is attributed to the influence of the second capacitor Ccb is discussed.

Firstly, see the $n^{th}$ pixel row. The pixel electrode 16 of the $n^{th}$ pixel row is capacitively coupled with the gate bus line G(n+1) via the second capacitor Ccb. Immediately before time t4, scan signal voltage Vg(n+1) supplied to the gate bus line G(n+1) is VgH (high). At time t4, scan signal voltage Vg(n+1) changes from VgH (high) to VgL (low). Immediately after time t4, due to the feedthrough phenomenon which is attributed to the influence of the second capacitor Ccb, the voltage of the pixel electrode 16 decreases by the magnitude of feedthrough voltage ΔVb. Feedthrough voltage ΔVb is expressed by the following formula:

$$\Delta Vb = (VgH - VgL) \times CCB/Cpix.$$

Voltage Vl(n) of the pixel electrode 16 of the $n^{th}$ pixel row is expressed by:

$$Vl(n) = Vs - \Delta Va - \Delta Vb$$

where Vs is the display signal voltage supplied from the source bus line 14.

Next, feedthrough voltage ΔVb which is attributed to the influence of the second capacitor Ccb in the $(n+1)^{th}$ pixel row is discussed.

The pixel electrode 16 of the $(n+1)^{th}$ pixel row is capacitively coupled with the gate bus line G(n+2) via the second capacitor Ccb. Scan signal voltage Vg(n+2) supplied to the gate bus line G(n+2) switches from VgL (low) to VgH (high) at time t3 that is precedent to time t4 (t3<t4). Therefore, immediately before time t4, scan signal voltage Vg(n+2) supplied to the gate bus line G(n+2) is VgH (high). Thereafter, at time t6, scan signal voltage Vg(n+2) changes from VgH (high) to VgL (low). Immediately after time t6, due to the feedthrough phenomenon which is attributed to the influence of the second capacitor Ccb, the voltage of the pixel electrode 16 decreases by the magnitude of feedthrough voltage ΔVb. Feedthrough voltage ΔVb is expressed by the following formula:

$$\Delta Vb = (VgH - VgL) \times CCB/Cpix.$$

Subsequently, scanning of the gate bus lines is carried out in the same way. For example, scan signal voltages Vg(n+4) and Vg(n+5) switch from VgL (low) to VgH (high) at time t5 that is precedent to time t6 (t5<t6).

Voltage Vl(n+1) of the pixel electrode 16 of the $(n+1)^{th}$ pixel row is expressed by:

$$Vl(n) = Vs - \Delta Va - \Delta Vb,$$

and is equal to voltage Vl(n) of the pixel electrode 16 of the $n^{th}$ pixel row.

As described above, the liquid crystal display device 100 is capable of making uniform the influence of the feedthrough voltage which is attributed to the second capacitor Ccb and is therefore capable of suppressing occurrence of display unevenness. In the liquid crystal display device 100, the potential of a gate bus line which forms the second capacitor Ccb of each pixel immediately before the TFT of that pixel switches from an ON state to an OFF state (open circles in FIG. 4) is equal among the pixel rows.

Display signal voltage Vs supplied from the source bus line may be set to a value in which feedthrough voltage ΔVa which is attributed to the influence of the first capacitor Cca and feedthrough voltage ΔVb which is attributed to the influence of the second capacitor Ccb are considered for the voltage that provides a grayscale level to be displayed.

A liquid crystal display device of the embodiment of the present invention has a period in which the gate bus lines associated with the $p^{th}$ group and the $(p+1)^{th}$ group are concurrently selected (the period between time t3 and time t4). A period between switching from VgL (low) to VgH (high) of the scan signal voltage supplied to the gate bus lines associated with the $(p+1)^{th}$ group Gr(p+1) and switching from VgH (high) to VgL (low) of the scan signal voltage supplied to the gate bus lines associated with the $p^{th}$ group Gr(p) is referred to as "period Δtv". In the period Δtv, the same display signal voltage is supplied to two pixels from each source bus line 14. The period Δtv is sufficiently smaller than one vertical scanning period (1V) and, therefore, the influence on the display quality is small. Rather, the effect of suppressing occurrence of display unevenness by making uniform the influence of the feedthrough voltage which is attributed to the second capacitor Ccb is large. The length of the period Δtv is, for example, equal among all of the pixel row groups.

The length of the period Δtv is, for example, not more than 1H. For example, when the length of the period Δtv is 1H and the number of pixels in the liquid crystal display device is 768 rows×1024 columns, it can be estimated that the proportion of the period Δtv to the vertical scanning period (1V) is not more than 0.13% (1/768) in a driving method in which the gate bus lines are scanned in a one by one manner, and is not more than 0.26% (2/768) in a driving method in which the gate bus lines are scanned in a two by two manner. In either case, the influence on the display quality is small.

In the illustrated example, scan signal voltage Vg has an ideal waveform, although the waveform of scan signal voltage Vg can become dull due to the load of the gate bus line 12 (the product of the capacitance and the resistance (also referred to as "CR product")). The length of the period Δtv is preferably set in consideration of the dullness of the waveform of scan signal voltage Vg. That is, the length of the period Δtv is preferably set to be longer than the time required for the value of scan signal voltage Vg to change from VgL (low) to VgH (high). In this case, the influence of the feedthrough voltage which is attributed to the second capacitor Cdb can be made uniform and, therefore, occurrence of display unevenness can be suppressed.

Usually, the degree of dullness of the waveform of scan signal voltage Vg in a pixel distant from the gate driver is greater than the degree of dullness of the waveform of scan signal voltage Vg in a pixel close to the gate driver. In this case, the time required for the value of scan signal voltage Vg in a pixel distant from the gate driver to change from VgL (low) to VgH (high) is longer than the time required for the value of scan signal voltage Vg in a pixel close to the gate driver to change from VgL (low) to VgH (high). Note that, however, the "timing of switching of scan signal voltage Vg from VgL (low) to VgH (high)" refers to the timing of rising of scan signal voltage Vg. This is not affected by the load of the gate bus line 12. That is, it does not depend on the position of the pixel (the distance from the gate driver). In this specification, "switching of scan signal voltage Vg from VgL (low) to VgH (high)" refers to rising of scan signal voltage Vg. In other words, "switching of scan signal voltage Vg from VgL (low) to VgH (high)" refers to switching from VgL (low) to VgH (high) of a scan signal voltage generated in the gate driver so as to be supplied to the gate bus line. Likewise, "switching of scan signal voltage Vg from VgH (high) to VgL (low)" refers to falling of scan signal voltage Vg. In other words, "switching of scan signal voltage Vg from VgH (high) to VgL (low)" refers to switching from VgH (high) to VgL (low) of a scan signal voltage generated in the gate driver so as to be supplied to the gate bus line.

Further, the liquid crystal display device 100 has the period Δtv and is therefore capable of sufficiently charging pixels. For example, see the $p^{th}$ group. At time t1, scan signal voltages Vg(n) and Vg(n+1) switch from VgL (low) to VgH (high) and, therefore, at time t2, the values of scan signal voltages Vg(n) and Vg(n+1) are greater than VgL (low). Thus, in charging each pixel of the pixel rows of the $p^{th}$ group Gr(p), the influence of the dullness of the scan signal voltage can be suppressed. Therefore, the pixel can be sufficiently charged. It is preferred that, at time t2, the values of scan signal voltages Vg(n) and Vg(n+1) have already reached VgH (high).

In each frame period, it is preferred that the polarity of a display signal voltage supplied to each of the plurality of source bus lines 14 does not change. For example, if the polarity of the display signal voltage inverts every 1H (the period is 2H), the polarity of a display signal voltage supplied between time t1 and time t2 and the polarity of the display signal voltage supplied between time t2 and time t4 are different from each other in the $n^{th}$ pixel row. In this case, the display quality can deteriorate. Further, there is a probability that each pixel will not be sufficiently charged for a grayscale level to be displayed by that pixel. Further, since the period of polarity inversion of the display signal voltage is short, the power consumption can increase.

The timing of switching of the values of display signal voltages Vsa and Vsb in each frame period is described.

When display signal voltages Vsa and Vsb switch from a value to be supplied to the pixel rows of the $p^{th}$ group Gr(p) to a value to be supplied to the pixel rows of the $(p+1)^{th}$ group before the scan signal voltage supplied to the gate bus lines G(n) and G(n+1) that are associated with the $p^{th}$ group switches from VgH (high) to VgL (low), a display signal voltage whose value is different from the value of the display signal voltage which is supposed to be supplied can be supplied to the pixel rows of the $p^{th}$ group Gr(p). In this case, the display quality can deteriorate. Thus, it is preferred that the timing of switching of display signal voltages Vsa and Vsb from a value to be supplied to the pixel rows of the $p^{th}$ group to a value to be supplied to the pixel rows of the $(p+1)^{th}$ group is later than the timing of switching from VgH (high) to VgL (low) of the scan signal voltage supplied to the gate bus lines G(n) and G(n+1) that are associated with the $p^{th}$ group. In FIG. 4, the difference between these times (timings) is represented as Δts. The length of the period Δts is, naturally, shorter than 1H.

As previously described, the waveform of scan signal voltage Vg can become dull due to the load (CR product) of the gate bus lines 12. It is further preferred that the length of the period Δts is appropriately adjusted in consideration of the dullness of the waveform of scan signal voltage Vg. That is, it is further preferred that the timing of switching of display signal voltages Vsa and Vsb from a value to be supplied to the pixel rows of the $p^{th}$ group to a value to be supplied to the pixel rows of the $(p+1)^{th}$ group occurs after the value of the scan signal voltage supplied to the gate bus lines G(n) and G(n+1) that are associated with the $p^{th}$ group reaches VgL (low).

Occurrence of flickers can be suppressed by appropriately adjusting the connection between the TFTs 18 and the source bus lines 14 and the polarity of the source bus lines 14.

For example, in each frame period, the polarities of display signal voltages supplied to two source bus lines associated with each pixel column are preferably different from each other. For example, in each frame period, the polarities of display signal voltages supplied to two source bus lines Sa(m) and Sb(m) that are associated with the $m^{th}$ pixel column are preferably different from each other. In this case, as shown in FIG. 2, in each pixel column, two pixels adjoining each other in a column direction are preferably associated with different source bus lines. This allows the liquid crystal display device 100 to exhibit a one dot inversion state in each pixel column (i.e., the polarity inverses every row) in each frame period. Therefore, occurrence of flickers can be suppressed.

In each pixel row, two adjoining pixels are preferably associated with source bus lines to which display signal voltages of different polarities are supplied in each frame period. This allows the liquid crystal display device 100 to exhibit a one-row, one-column dot inversion state in each frame period. Therefore, occurrence of flickers can be suppressed.

For example, in FIG. 2, the polarities of display signal voltages supplied to two of the plurality of source bus lines 14 which adjoin each other are different from each other. In this case, by connecting the TFTs 18 and the source bus lines 14 as shown in FIG. 2, a one-row, one-column dot inversion state can be exhibited in each frame period. The connection between the TFTs 18 and the source bus lines 14 and the polarity of the source bus lines 14 are not limited to the above-described example but, as a matter of course, may be appropriately adjusted so as to exhibit a one-row, one-column dot inversion state in each frame period.

Now, the relationship between the electrostatic capacitance value of the second capacitor Ccb and display unevenness is discussed. Electrostatic capacitance value CCB of the second capacitor Ccb is expressed by the following formula:

$$CCB = \Delta Vb/(VgH-VgL) \times Cpix.$$

From this formula, electrostatic capacitance value CCB of the second capacitor Ccb is estimated which can cause display unevenness in liquid crystal display devices to which the driving methods of Comparative Examples 1 and 2 are applied. For example, in the case of a 256 grayscale level representation from level 0 to level 255, if the difference in displayed grayscale level between adjoining pixels is one or more, there is a probability that it will be visually perceived as display unevenness. The single level difference in displayed grayscale level corresponds to a difference of approximately not less than 10 mV in voltage applied across the liquid crystal layer. Although this value varies depending on the operation mode of the liquid crystal display device or the value of the effective voltage applied across the liquid crystal layer, the estimated minimum value of this value is about 10 mV. The difference between VgL (low) and VgH (high) of the scan signal voltage supplied to the gate bus line is at most about 50 V. Therefore, $\Delta Vb/(VgH-VgL)$ in the formula shown above is estimated to be not less than about 0.02% (=10 mV/50 V). That is, if electrostatic capacitance value CCB of the second capacitor Ccb is not less than 0.02% of electrostatic capacitance value Cpix of the pixel capacitor, there is a probability that display unevenness will occur due to the circumstance that the influence of the feedthrough voltage which is attributed to the second capacitor Ccb varies every pixel row. As the proportion of electrostatic capacitance value CCB of the second capacitor Ccb to electrostatic capacitance value Cpix of the pixel capacitor increases, feedthrough voltage $\Delta Vb$ which is attributed to the second capacitor Ccb increases. Therefore, display unevenness is more likely to be visually perceived.

As previously described, when the electrostatic capacitance value of the second capacitor Ccb is not less than 0.02% of the electrostatic capacitance value of the pixel capacitor, display unevenness can occur. That is, as for the display unevenness, a capacitor whose electrostatic capacitance value is less than 0.02% of the electrostatic capacitance value of the pixel capacitor is substantially negligible. In this specification, the "parasitic capacitor" refers to a parasitic capacitor whose electrostatic capacitance value is not less than 0.02% of the electrostatic capacitance value of the pixel capacitor. Also, "the pixel electrode 16 being capacitively coupled with the gate bus lines 12" means that, between the pixel electrode 16 and the gate bus lines 12, there is a capacitor whose electrostatic capacitance value is not less than 0.02% of the electrostatic capacitance value of the pixel capacitor.

The first capacitor Cca may include a parasitic capacitor between the gate electrode 12g and the drain electrode 14d of the TFT 18. Note that the first capacitor Cca may not be formed. This is because, so long as the second capacitor Ccb is formed between the pixel electrode 16 and the non-corresponding gate bus line 12, display unevenness can occur even when the first capacitor Cca is not formed between the pixel electrode 16 and the corresponding gate bus line 12.

The configuration of the second capacitor 13b is not limited to that shown in FIG. 3. Another example of the configuration of the second capacitor 13b is described with reference to FIG. 5. FIG. 5(a) is another example of a plan view schematically showing the liquid crystal display device 100. FIG. 5(b) is a schematic cross-sectional view of a TFT substrate 10 taken along line 5B-5B' of FIG. 5(a).

As shown in FIG. 5, also in the case where the pixel electrode 16 of the pixel P(n, m) does not overlap with the gate bus line G(n+1) that is associated with the $(n+1)^{th}$ pixel row when viewed in a normal direction of the TFT substrate 10, the second capacitor 13b can be formed between the pixel electrode 16 of the pixel P(n, m) and the gate bus line G(n+1). As shown in FIG. 5(b), the second capacitor 13b can be formed by, for example, the pixel electrode 16 of the pixel P(n, m), the gate bus line G(n+1), and the insulating layer 15 provided between the pixel electrode 16 and the gate bus line G(n+1).

The second capacitor 13b formed by the structure shown in FIG. 5 has a tendency to have a smaller electrostatic capacitance value than the second capacitor 13b formed by the structure shown in FIG. 3. Note that, however, this is not necessarily true due to the dielectric constant or thickness of the insulating layer 15.

Usually, as the area of the pixel electrode 16 increases, the aperture ratio of the liquid crystal display device can improve. The aperture ratio refers to the proportion of the area of a portion of the display region of a liquid crystal display device which contributes to actual displaying with respect to the area of the display region of the liquid crystal display device. To improve the aperture ratio of the liquid crystal display device, the pixel electrode 16 is arranged in many cases so as to overlap with the gate bus line 12 as shown in FIG. 3, unlike the structure shown in FIG. 5. In this case, usually, electrostatic capacitance value CCB of the second capacitor Ccb is large as compared with the structure shown in FIG. 5. Therefore, feedthrough voltage $\Delta Vb$ which is attributed to the influence of the second capacitor Ccb is large, so that display unevenness can readily be visually perceived. According to the driving method of the embodiment of the present invention, occurrence of display unevenness can be suppressed even in such a case.

The effect of suppressing occurrence of display unevenness can be achieved when the pixel electrode 16 of one pixel row is capacitively coupled via the second capacitor Ccb with a gate bus lines 12 associated with a pixel row which is to be selected right after that pixel row. This can be expressed as follows. Where two of the plurality of pixel rows which adjoin each other in a column direction and which are included in different pixel row groups are the first pixel row and the second pixel row, the first pixel row includes a pixel which has a pixel electrode 16 capacitively coupled with a gate bus lines 12 associated with the second pixel row. When the first pixel row is included in the $q^{th}$ group (q is an integer not less than 1), the second pixel row is included in the $(q+1)^{th}$ group.

The second capacitor 13b may not necessarily be a parasitic capacitor. The second capacitor 13b may be a storage capacitor for holding the voltage applied to the liquid crystal capacitor. To allow the second capacitor 13b to function as the storage capacitor, when the maximum value of the electrostatic capacitance value of the liquid crystal capacitor is 1, the second capacitor 13b preferably has an electrostatic capacitance value of, for example, not less than 1. Note that the electrostatic capacitance value of the liquid crystal capacitor depends on the voltage applied across the liquid crystal layer. Usually, as the voltage applied across the liquid crystal layer increases, the dielectric constant of the liquid crystal layer increases and, therefore, the electrostatic capacitance value of the liquid crystal capacitor increases.

An example of the configuration in which the second capacitor 13b is a storage capacitor is a so-called Cs on-gate configuration. In the Cs on-gate configuration, the storage capacitor is formed by an electrode electrically connected to the pixel electrode 16, a non-corresponding gate bus line 12, and an insulating layer provided therebetween. When the second capacitor 13b is such a storage capacitor, display unevenness such as described above can occur, where occurrence of display unevenness can be suppressed by the driving method of the present embodiment.

Next, variations of the liquid crystal display device of the present embodiment are described.

Figure 6:
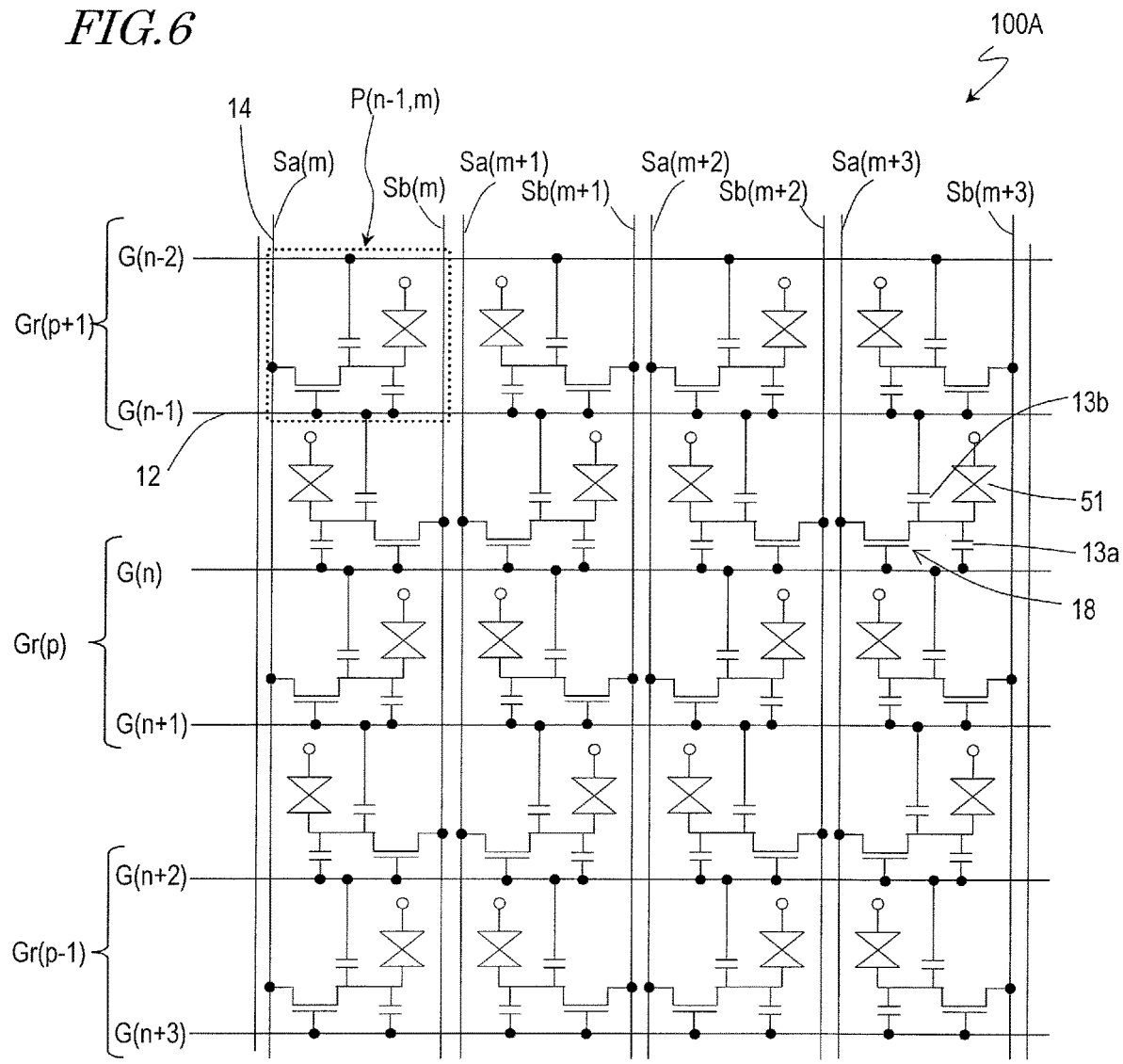
FIG. 6 is a diagram schematically showing an equivalent circuit (for 20 pixels in 5 rows and 4 columns) of a liquid crystal display device 100A that is a variation of the liquid crystal display device 100.
Figure 7:
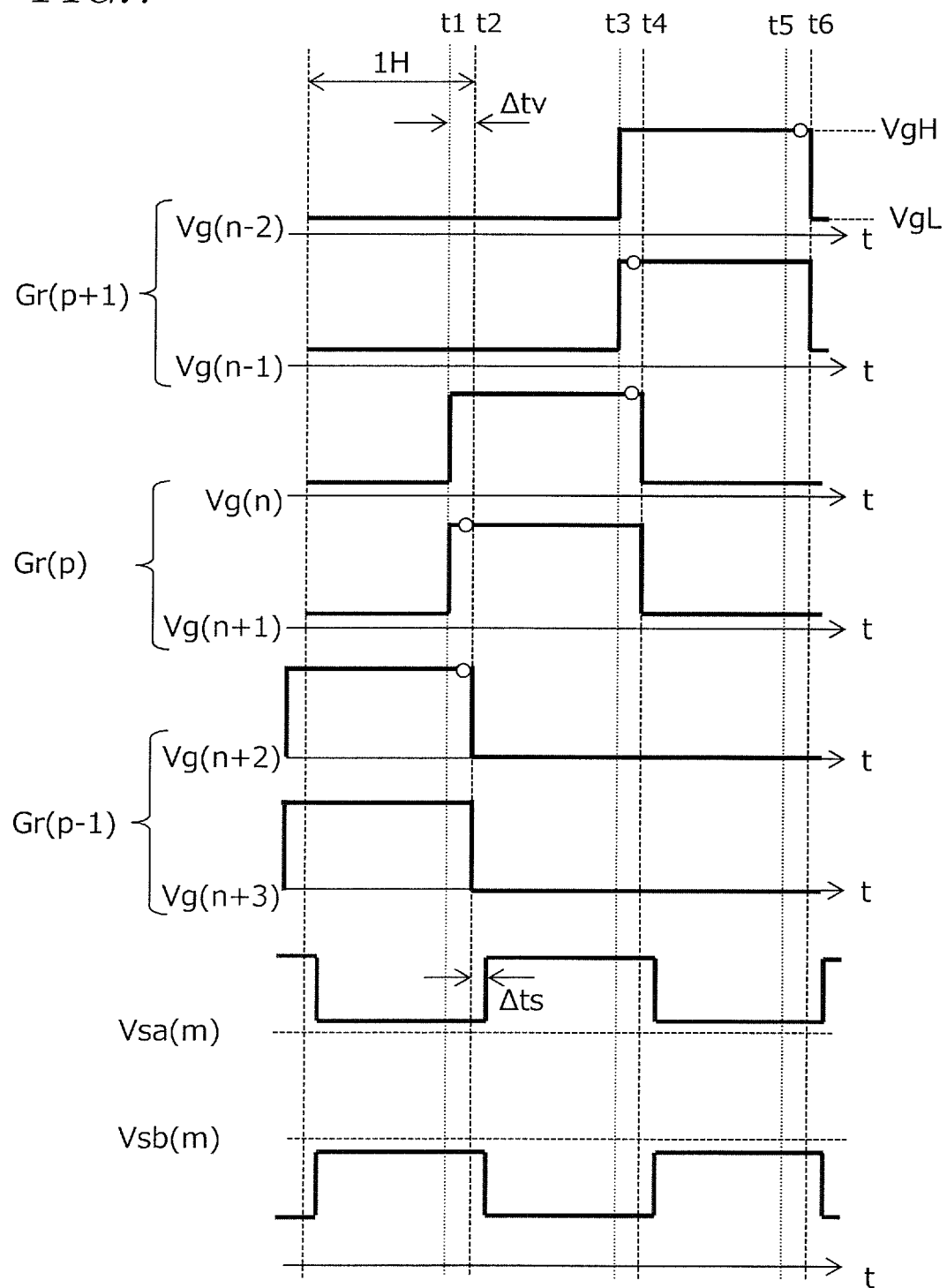
FIG. 7 is a diagram showing the waveforms of scan signal voltages Vg and display signal voltages Vs used in driving the liquid crystal display device 100A.

A liquid crystal display device 100A which is a variation of the liquid crystal display device 100 is described with reference to FIG. 6 and FIG. 7. FIG. 6 is a diagram schematically showing an equivalent circuit (for 20 pixels in 5 rows and 4 columns) of the liquid crystal display device 100A. FIG. 7 is a diagram showing the waveforms of scan signal voltage Vg and display signal voltage Vs used in driving the liquid crystal display device 100A.

In the liquid crystal display device 100, the pixel electrode 16 of the $(n-1)^{th}$ pixel row is capacitively coupled with the gate bus line G(n) via the second capacitor 13b. The gate bus line G(n-1) is associated with the $(p-1)^{th}$ group Gr(p-1). The gate bus line G(n) is associated with the $p^{th}$ group Gr(p). In comparison, in the liquid crystal display device 100A, the pixel electrode 16 of the $n^{th}$ pixel row is capacitively coupled with the gate bus line G(n-1) via the second capacitor 13b. The gate bus line G(n) is associated with the $p^{th}$ group Gr(p). The gate bus line G(n-1) is associated with the $(p+1)^{th}$ group Gr(p+1).

The liquid crystal display device 100A that has the above-described configuration can also achieve the same effects as the liquid crystal display device 100.

Each pixel row group may include N pixel rows which adjoin one another in a column direction (N is an integer not less than 3). In the example illustrated in FIG. 8 and FIG. 9, N=4.

Figure 8:
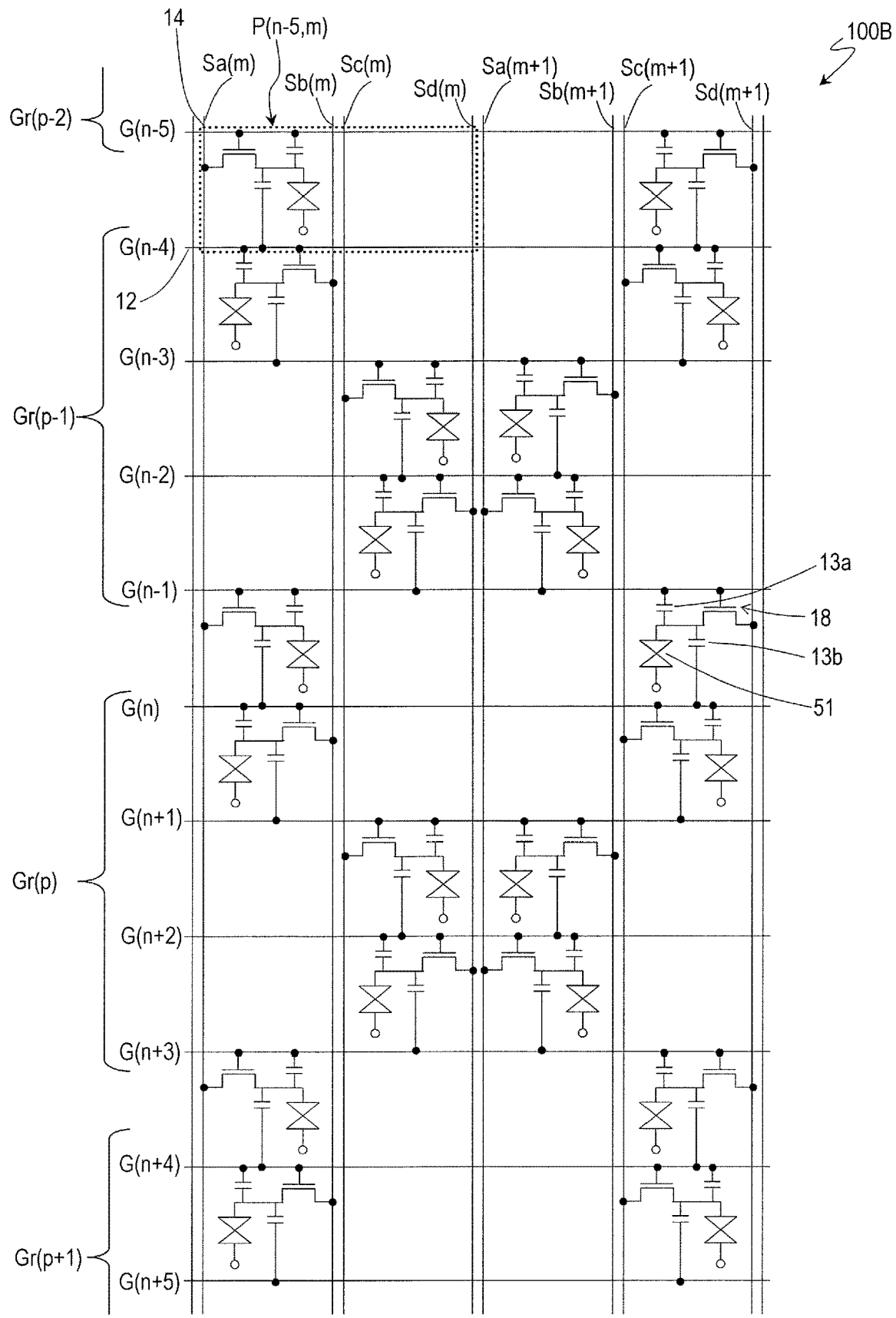
FIG. 8 is a diagram schematically showing an equivalent circuit (for 20 pixels in 10 rows and 2 columns) of a liquid crystal display device 100B that is another variation of the liquid crystal display device 100.
Figure 9:
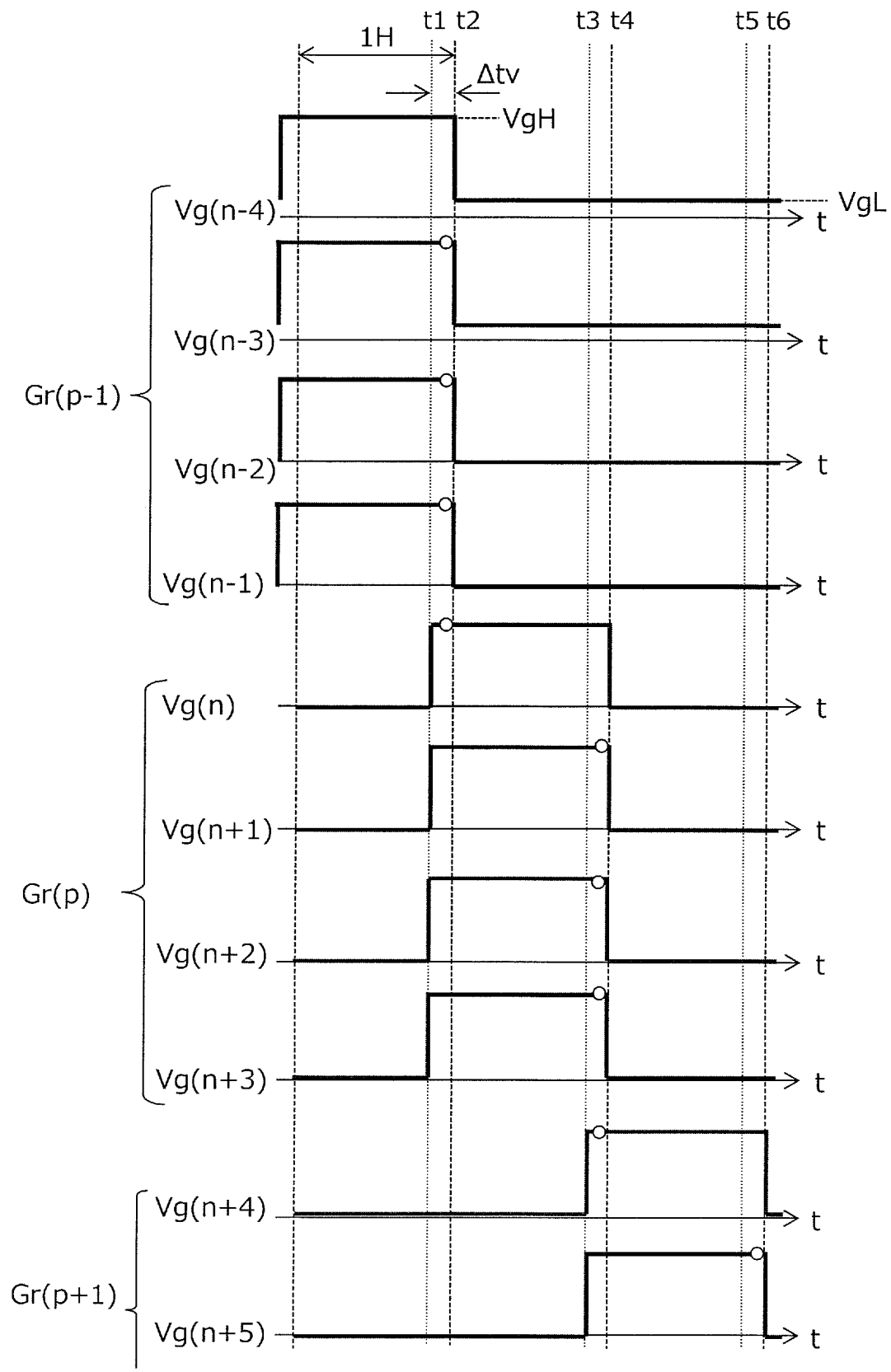
FIG. 9 is a diagram showing the waveforms of scan signal voltages Vg used in driving the liquid crystal display device 100B.

The liquid crystal display device 100B that is another variation of the liquid crystal display device 100 is described with reference to FIG. 8 and FIG. 9. FIG. 8 is a diagram schematically showing an equivalent circuit (for 20 pixels in 10 rows and 2 columns) of the liquid crystal display device 100B. FIG. 9 is a diagram showing the waveform of scan signal voltage Vg used in driving the liquid crystal display device 100B.

In the liquid crystal display device 100, each pixel row group includes two pixel rows which adjoin each other in a column direction. Each pixel column is associated with any two of the source bus lines 14. In comparison, in the liquid crystal display device 100B, each pixel row group includes four pixel rows which adjoin one another in a column direction. Each pixel column is associated with any four of the source bus lines 14. Source bus lines 14 associated with the $m^{th}$ pixel column are also referred to as source bus lines Sa(m), Sb(m), Sc(m) and Sd(m). In the drawings, the source bus lines 14 associated with the $m^{th}$ pixel column are referred to, from left to right, as source bus lines Sa(m), Sb(m), Sc(m) and Sd(m). In each pixel column, four pixel rows included in each of the plurality of pixel row groups are associated with different source bus lines.

The liquid crystal display device 100B that has the above-described configuration can also achieve the same effects as the liquid crystal display device 100.

Figure 25:
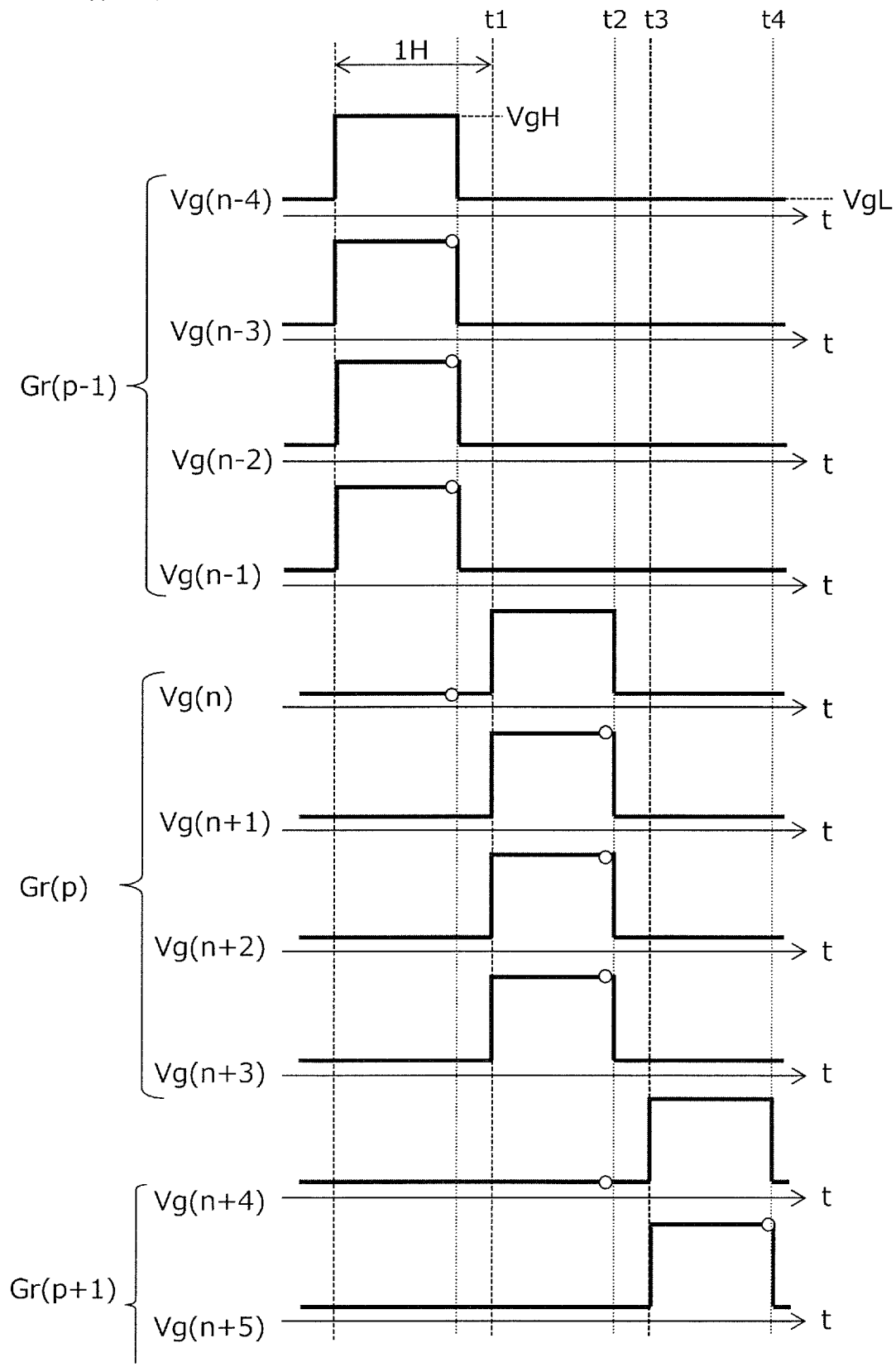
FIG. 25 is a diagram showing the waveforms of scan signal voltages Vg used in the driving method of Comparative Example 3.

FIG. 25 is a diagram showing the waveform of scan signal voltage Vg used in the driving method of Comparative Example 3. The driving method of Comparative Example 3 is different from the driving method which uses the scan signal voltage shown in FIG. 9 in that, in each frame period, the scan signal voltage supplied to the gate bus lines associated with the $(p+1)^{th}$ group Gr(p+1) switches from VgL (low) to VgH (high) after the scan signal voltage supplied to the gate bus lines associated with the $p^{th}$ group Gr(p) switches from VgH (high) to VgL (low). In a liquid crystal display device to which the driving method of Comparative Example 3 is applied, display unevenness occurs for the same reason as that described with reference to FIG. 23. In a liquid crystal display device to which the driving method of Comparative Example 3 is applied, display unevenness occurs at every fourth pixel row. Since a pixel row which has different brightness (i.e., different display luminance) from those of the other pixel rows occurs at every fourth pixel row, display unevenness is readily visually perceived. In the example illustrated in FIG. 25, the $(n-4)^{th}$ pixel row, the $n^{th}$ pixel row, the $(n+4)^{th}$ pixel row, . . . have different brightness (i.e., different display luminance) from those of the other pixel rows. According to the liquid crystal display device 100B, occurrence of such display unevenness can be suppressed.

In the liquid crystal display device 100B, the connection between the TFTs 18 and the source bus lines 14 and the polarity of the source bus lines 14 are preferably set so as to exhibit a one-row, one-column dot inversion state in each frame period. In this case, occurrence of flickers can be suppressed. For example, display signal voltages supplied to any two of the plurality of source bus lines 14 which adjoin each other preferably have different polarities. In this case, an existing source driver for dot inversion driving of a liquid crystal display device can be utilized without modification. The connection between the TFTs 18 and the source bus lines 14 is not limited to the example illustrated in FIG. 8 but may be appropriately adjusted so as to exhibit a one-row, one-column dot inversion state in each frame period.

Embodiment 2

Figure 10:
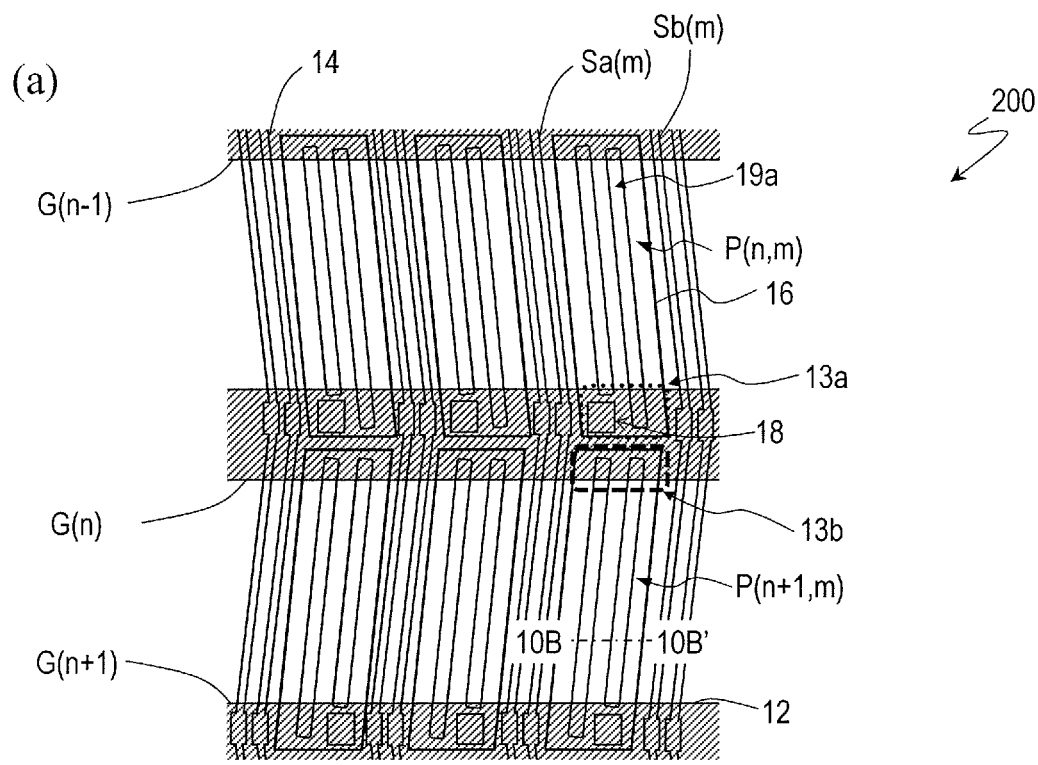
FIG. 10(a) is a plan view schematically showing a liquid crystal display device 200 of Embodiment 2 of the present invention.
FIG. 10(b) is a schematic cross-sectional view taken along line 10B-10B' of FIG. 10(a).
Figure 10:
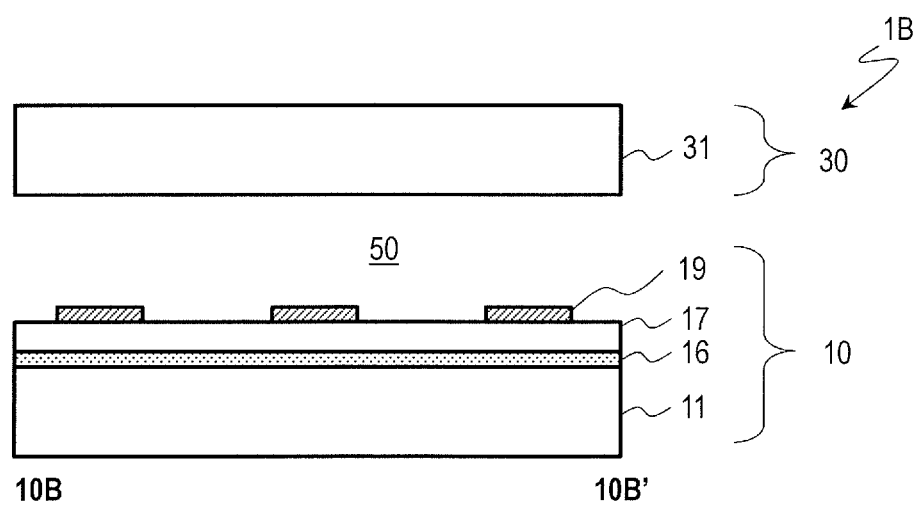

FIG. 10 shows a liquid crystal display device 200 of the present embodiment. FIG. 10(a) is a plan view schematically showing the liquid crystal display device 200. FIG. 10(b) is a schematic cross-sectional view taken along line 10B-10B' of FIG. 10(a). In the following description, the differences of the liquid crystal display device 200 from the liquid crystal display device 100 of Embodiment 1 are mainly described.

The liquid crystal display device 200 is a FFS (Fringe Field Switching) mode liquid crystal display device and is different from the liquid crystal display device 100 in this point.

The liquid crystal display device 200 includes a liquid crystal display panel 18. As shown in FIG. 10(b), the liquid crystal display panel 1B includes a first substrate 10 and a second substrate 30, which oppose each other, and a liquid crystal layer 50 provided between the first substrate 10 and the second substrate 30. The first substrate 10 includes a first transparent substrate (for example, glass substrate) 11, a pixel electrode 16 provided on the first transparent substrate 11, and a common electrode 19 which cooperates with the pixel electrode 16 to produce a transverse electric field across the liquid crystal layer 50. The pixel electrode 16 is provided in each of the plurality of pixels included in the liquid crystal display device 200. The second substrate 30 includes a second transparent substrate (for example, glass substrate) 31.

The first substrate 10 includes an electrode pair for producing a transverse electric field across the liquid crystal layer 50. Herein, the pixel electrode 16 and the common electrode 19 constitute an electrode pair. The liquid crystal capacitor 51 is formed by the pixel electrode 16, the common electrode 19 and the liquid crystal layer 50. The common electrode 19 is provided on the liquid crystal layer 50 side of the pixel electrode 16 via an insulating layer 17. The common electrode 19 has a plurality of rectangular openings 19a extending in parallel with one another as shown in FIG. 10(a). When necessary, on the liquid crystal layer 50 side of the pixel electrode 16, a protection film and an alignment film (both not shown) are provided. On the liquid crystal layer 50 side of the second transparent substrate 31, for example, a color filter layer and an alignment film (both not shown) can be provided.

The scan signal voltage and the display signal voltage used for driving the liquid crystal display device 200 may be the same as those of Embodiment 1. The liquid crystal display device 200 is capable of making uniform the influence of the feedthrough voltage which is attributed to the second capacitor and is therefore capable of suppressing occurrence of display unevenness.

The FFS mode liquid crystal display device of the present embodiment is not limited to the illustrated configuration but is broadly applicable to known FFS mode liquid crystal display devices. For example, the pixel electrode 16 may be arranged so as to overlap with the source bus line 14. For example, the liquid crystal layer 50 may include liquid crystal molecules having positive dielectric anisotropy or may include liquid crystal molecules having negative dielectric anisotropy. Also, for example, the common electrode 19 and the pixel electrode 16 may change positions with each other.

When the positions of the common electrode 19 and the pixel electrode 16 are changed with each other, the problem of occurrence of display unevenness is unlikely to arise. When the common electrode 19 is provided between the pixel electrode 16 and the gate bus lines 12, the pixel electrode 16 is not capacitively coupled with the gate bus lines 12 in many cases because the common electrode 19 is for supplying a potential which is common among all of the pixels.

In comparison, when the common electrode 19 is closer to the liquid crystal layer 50 than the pixel electrode 16 is as shown in FIG. 10, display unevenness occurs in many cases. In this case, occurrence of display unevenness can be suppressed by applying the previously-described driving method.

The embodiment of the present invention is not limited to FFS mode liquid crystal display devices but is broadly applicable to liquid crystal display devices of a transverse electric field mode such as, for example, IPS (In-Plane Switching) mode.

Embodiment 3

A liquid crystal display device 300 of the present embodiment is described. The liquid crystal display device 300 of the present embodiment has excellent response characteristics and is suitably used as a see-through display. The liquid crystal display device 300 is capable of suppressing occurrence of display unevenness which is attributed to such a driving method that the gate bus lines are selected in a group by group manner with a common scan signal voltage.

An example of the liquid crystal display device which has excellent response characteristics and excellent display quality and which is suitably used as a see-through display is disclosed in WO 2014/136586 of the present applicant. The entire disclosure of WO 2014/136586 is incorporated by reference in this specification.

The configuration of a liquid crystal display device 800 of Reference Example is described prior to the description of the configuration of the liquid crystal display device 300. The liquid crystal display device 800 of Reference Example is, for example, a liquid crystal display device disclosed in WO 2014/136586. In the driving method of the liquid crystal display device 800 of Reference Example, the gate bus lines are selected in a one by one manner, while in the driving method of the liquid crystal display device 300 of the present embodiment, the gate bus lines are selected in a group by group manner with a common scan signal voltage. The liquid crystal display device 800 of Reference Example is different from the liquid crystal display device 300 of the present embodiment in the number of source bus lines associated with each pixel column. Since the configuration and the driving method of the liquid crystal display device 300 of the present embodiment are similar to the configuration and the driving method of the liquid crystal display device 800 of Reference Example except for the aforementioned point, the descriptions of the configuration and the driving method of the liquid crystal display device 800 of Reference Example also apply to the configuration and the driving method of the liquid crystal display device 300 of the present embodiment.

Figure 11:
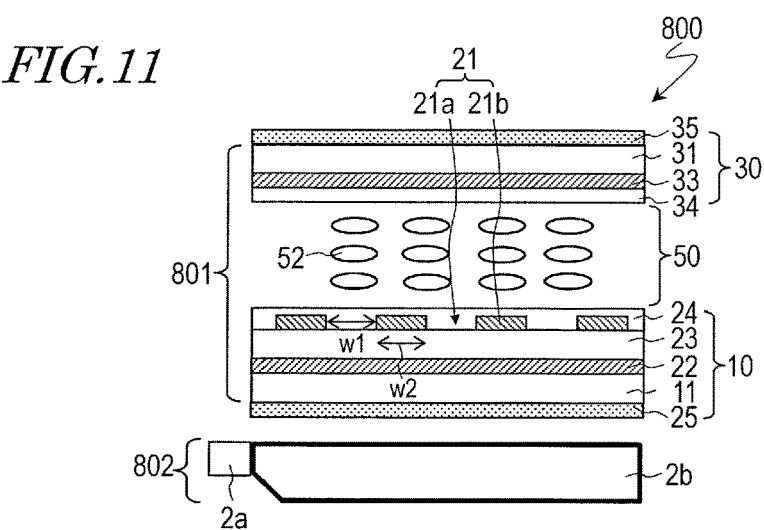
FIG. 11 is a cross-sectional view schematically showing a liquid crystal display device 800 of Reference Example.
Figure 12:
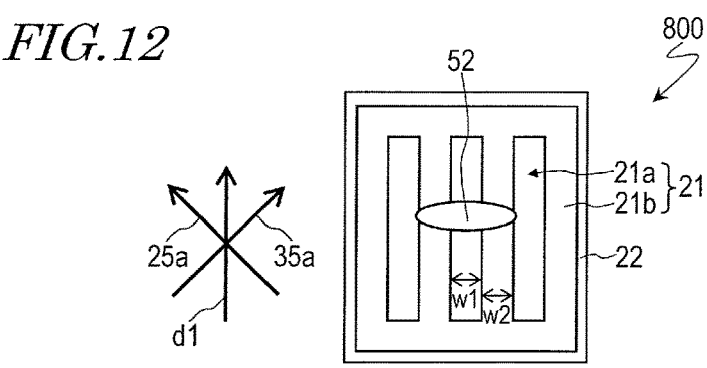
FIG. 12 is a plan view schematically showing the liquid crystal display device 800 of Reference Example.

The liquid crystal display device 800 of Reference Example is described with reference to FIG. 11 and FIG. 12. FIG. 11 is a cross-sectional view schematically showing the liquid crystal display device 800 of Reference Example. FIG. 12 is a plan view schematically showing the liquid crystal display device 800 of Reference Example.

The liquid crystal display device 800 of Reference Example includes a liquid crystal display panel 801 and a lighting device 802 as shown in FIG. 11. The liquid crystal display device 800 includes a plurality of pixels arranged in a matrix. In FIG. 11 and FIG. 12, an electrode structure corresponding to a single pixel is shown. The liquid crystal display device 800 carries out color displaying in a field sequential fashion as will be described later.

The liquid crystal display panel 801 includes a first substrate 10 and a second substrate 30, which oppose each other, and a liquid crystal layer 50 provided between the first substrate 10 and the second substrate 30. In the present embodiment, in the following description, one of the first substrate 10 and the second substrate 30 which is relatively on the rear side, i.e., the first substrate 10, is referred to as "rear substrate", and the other substrate which is relatively on the front side (viewer side), i.e., the second substrate 30, is referred to as "front substrate".

The rear substrate 10 includes a first electrode 21 provided in each of the plurality of pixels and a second electrode 22 which cooperates with the first electrode 21 to produce a transverse electric field across the liquid crystal layer 50. The first electrode 21 is arranged so as to be located above the second electrode 22 via an insulating layer 23. In other words, the second electrode 22 is arranged so as to be located under the first electrode 21 via the insulating layer 23. In the following description, one of the first electrode 21 and the second electrode 22 which is relatively on the top side, i.e., the first electrode 21, is referred to as "upper layer electrode", and the other electrode which is relatively on the bottom side, i.e., the second electrode 22, is referred to as "lower layer electrode". The lower layer electrode 22, the insulating layer 23 and the upper layer electrode 21 are supported by a first transparent substrate (for example, glass substrate) 11 which is insulative.

The upper layer electrode 21 includes a plurality of slits 21a extending in a predetermined direction d1 and a plurality of branch portions 21b extending in parallel to the extending direction d1 of the slits 21a as shown in FIG. 11 and FIG. 12. Note that the number of slits 21a and the number of branch portions 21b are not limited to the example illustrated in FIG. 11 and FIG. 12. Also, the width of the slits 21a is not particularly limited. The width w1 of the slits 21a is typically not less than 2 μm and not more than 10 μm. The width w2 of the branch portions 21b is not particularly limited. The width w2 of the branch portions 21b is typically not less than 2 μm and not more than 10 μm. The upper layer electrode 21 is made of a transparent electrically-conductive material (for example, ITO).

The lower layer electrode 22 has no slit. That is, the lower layer electrode 22 is a so-called spread electrode. The lower layer electrode 22 is made of a transparent electrically-conductive material (for example, ITO).

The material of the insulating layer 23 is not particularly limited. Examples of the material of the insulating layer 23 include inorganic materials, such as silicon oxide ($SiO_2$) and silicon nitride ($SiN_x$), and organic materials such as photosensitive resins.

The front substrate 30 includes a third electrode (hereinafter, referred to as "counter electrode") 33 which is arranged so as to oppose the upper layer electrode (first electrode) 21 and the lower layer electrode (second electrode) 22. The counter electrode 33 is supported by the second transparent substrate (for example, glass substrate) 31 which is insulative.

The counter electrode 33 cooperates with the upper layer electrode 21 and the lower layer electrode 22 to produce a longitudinal electric field across the liquid crystal layer 50. The counter electrode 33 is made of a transparent electrically-conductive material (for example, ITO).

The liquid crystal layer 50 includes liquid crystal molecules 52 having positive dielectric anisotropy. Note that the orientation direction of the liquid crystal molecules 52 shown in FIG. 11 and FIG. 12 is an orientation direction which is achieved when no voltage is applied across the liquid crystal layer 50.

The liquid crystal display panel 801 further includes a pair of horizontal alignment films 24 and 34 which are arranged so as to oppose each other via the liquid crystal layer 50. One of the pair of horizontal alignment films 24 and 34 (hereinafter, also referred to as "first horizontal alignment film 24") is provided on the liquid crystal layer 50 side surface of the rear substrate 10. The other of the pair of horizontal alignment films 24 and 34 (hereinafter, also referred to as "second horizontal alignment film 34") is provided on the liquid crystal layer 50 side surface of the front substrate 30.

Each of the first horizontal alignment film 24 and the second horizontal alignment film 34 is provided with an alignment treatment so as to have an alignment regulating force which causes the liquid crystal molecules 52 of the liquid crystal layer 50 to be aligned in a predetermined direction (referred to as "pretilt direction"). As the alignment treatment, for example, a rubbing treatment or a photo-alignment treatment is conducted.

The pretilt directions defined by respective ones of the first horizontal alignment film 24 and the second horizontal alignment film 34 are set such that the liquid crystal molecules 52 in the absence of an applied voltage across the liquid crystal layer 50 (with no electric field produced) are in a homogeneous alignment. Specifically, the pretilt directions defined by respective ones of the first horizontal alignment film 24 and the second horizontal alignment film 34 are substantially perpendicular to the extending direction d1 of the slits 21a of the upper layer electrode 21. That is, the pretilt direction defined by the first horizontal alignment film 24 and the pretilt direction defined by the second horizontal alignment film 34 are parallel or antiparallel to each other.

The liquid crystal display panel 801 further includes a pair of polarizers 25 and 35 which are arranged so as to oppose each other via the liquid crystal layer 50. The transmission axis (polarization axis) 25a of one of the pair of polarizers 25 and 35 (hereinafter, also referred to as "first polarizer 25") and the transmission axis (polarization axis) 35a of the other polarizer (hereinafter, also referred to as "second polarizer 35") are substantially perpendicular to each other as shown in FIG. 12. That is, the first polarizer 25 and the second polarizer 35 are in a crossed Nicols arrangement. In the present embodiment, the transmission axes 25a and 35a of the first polarizer 25 and the second polarizer 35 each form an angle of about 45° to the pretilt directions defined by respective ones of the first horizontal alignment film 24 and the second horizontal alignment film 34. Therefore, the transmission axes 25a and 35a of the first polarizer 25 and the second polarizer 35 each form an angle of about 45° to the extending direction d1 of the slits 21a of the upper layer electrode 21.

The lighting device (also referred to as "backlight") 802 is placed on the rear surface side of the liquid crystal display panel 801. The lighting device 802 is capable of irradiating the liquid crystal display panel 801 with light of a plurality of colors, including red light, green light and blue light, in a switchable manner.

The lighting device 802 can be, for example, an edge-light type backlight such as shown in FIG. 11. The edge-light type backlight 802 includes a light source unit 2a and a light guide plate 2b. The light source unit 2a is capable of emitting light of a plurality of colors including red light, green light and blue light. The light source unit 2a includes, for example, a red LED, a green LED and a blue LED as the light sources. The light guide plate 2b is designed to guide colored light emitted from the light source unit 2a to the liquid crystal display panel 801.

The liquid crystal display device 800 carries out color displaying in a field sequential fashion. Therefore, the liquid crystal display panel 801 does not have color filters.

When a predetermined voltage is applied between the upper layer electrode 21 and the lower layer electrode 22 (i.e., a predetermined potential difference is introduced therebetween), a transverse electric field (fringe electric field) is produced across the liquid crystal layer 50. The "transverse electric field" refers to an electric field which includes a component substantially parallel to the substrate surface. The direction of the transverse electric field produced by the upper layer electrode 21 and the lower layer electrode 22 is substantially perpendicular to the extending direction d1 of the slits 21a of the upper layer electrode 21.

When a predetermined voltage is applied between the counter electrode 33 and the upper layer electrode 21 and the lower layer electrode 22 (i.e., a predetermined potential difference is introduced therebetween), a longitudinal electric field is produced. The "longitudinal electric field" refers to an electric field whose direction is substantially parallel to the normal direction of the substrate surface.

The liquid crystal display device 800 has a configuration which is capable of controlling the intensity of the transverse electric field and the longitudinal electric field in each pixel. Typically, the liquid crystal display device 800 has a configuration which is capable of supplying different voltages to respective pixels in each of the upper layer electrode 21 and the lower layer electrode 22. Specifically, both the upper layer electrode 21 and the lower layer electrode 22 are separately provided in each pixel. Each pixel includes a switching element (for example, a thin film transistor; not shown) which is electrically connected to the upper layer electrode 21 and a switching element (for example, a thin film transistor; not shown) which is electrically connected to the lower layer electrode 22. The upper layer electrode 21 and the lower layer electrode 22 are each supplied with a predetermined voltage via a corresponding switching element. The counter electrode 33 is in the form of a single electrically-conductive film which is continuous across all of the pixels. Therefore, the potential applied to the counter electrode 33 is common among all of the pixels.

Figure 13:
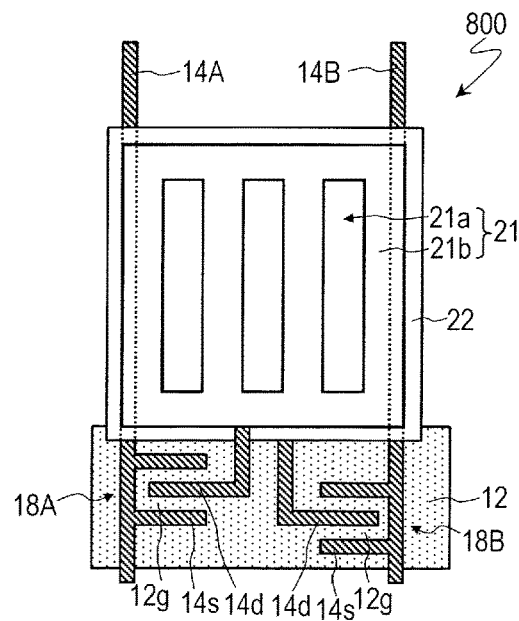
FIG. 13 is a plan view showing an example of a specific wiring structure in a rear substrate 10 of the liquid crystal display device 800 of Reference Example.

FIG. 13 shows a specific example of the wiring structure in the rear substrate 10. In the structure shown in FIG. 13, each pixel includes a first TFT 18A corresponding to the upper layer electrode 21 and a second TFT 18B corresponding to the lower layer electrode 22. The gate electrode 12g of each of the first TFT 18A and the second TFT 18B is electrically connected to a gate bus line 12. Herein, portions of the gate bus line 12 extending over the channel regions of the first TFT 18A and the second TFT 18B function as the gate electrodes 12g. The source electrode 14s of each of the first TFT 18A and the second TFT 18B is electrically connected to a source bus line 14. Herein, portions branching out from the source bus lines 14 function as the source electrodes 14s. The source bus lines 14 include a first source bus line 14A connected with the first TFT 18A and a second source bus line 14B connected with the second TFT 18B. That is, the source electrode 14s of the first TFT 18A is electrically connected to the first source bus line 14A, and the source electrode 14s of the second TFT 18B is electrically connected to the second source bus line 14B. The drain electrode 14d of the first TFT 18A is electrically connected to the upper layer electrode 21. Meanwhile, the drain electrode 14d of the second TFT 18B is electrically connected to the lower layer electrode 22. Note that the wiring structure of the rear substrate 10 is not limited to that illustrated in FIG. 13.

As previously described, the liquid crystal display device 800 of Reference Example carries out color displaying in a field sequential fashion. Therefore, the liquid crystal display panel 801 does not need color filters. Thus, the light utilization efficiency improves. Also, in the liquid crystal display device 800 of Reference Example, a longitudinal electric field is produced across the liquid crystal layer 50 in the black displaying state, and a transverse electric field is produced across the liquid crystal layer 50 in the white displaying state. Therefore, a torque which is attributed to voltage application can affect the liquid crystal molecules 52 at both falling (transition from the white displaying state to the black displaying state) and rising (transition from the black displaying state to the white displaying state). Thus, excellent response characteristics can be achieved.

In the liquid crystal display device 800 of Reference Example, each of the plurality of pixels can exhibit, in a switchable manner, a "black displaying state" where black displaying is carried out in the presence of a longitudinal electric field produced across the liquid crystal layer 50, a "white displaying state" where white displaying is carried out in the presence of a transverse electric field produced across the liquid crystal layer 50, and a "transparent displaying state" where the rear surface side of the liquid crystal display panel 801 (i.e., the background scene) is viewable through the liquid crystal display device 800 in the absence of an applied voltage across the liquid crystal layer 50. With this feature, a liquid crystal display device which is excellent in both response characteristics and display quality can be obtained as disclosed in WO 2014/136586 of the present applicant.

Hereinafter, the black displaying state, the white displaying state, and the transparent displaying state are described more specifically with reference to FIG. 14, FIG. 15, and FIG. 16.

Figure 14:
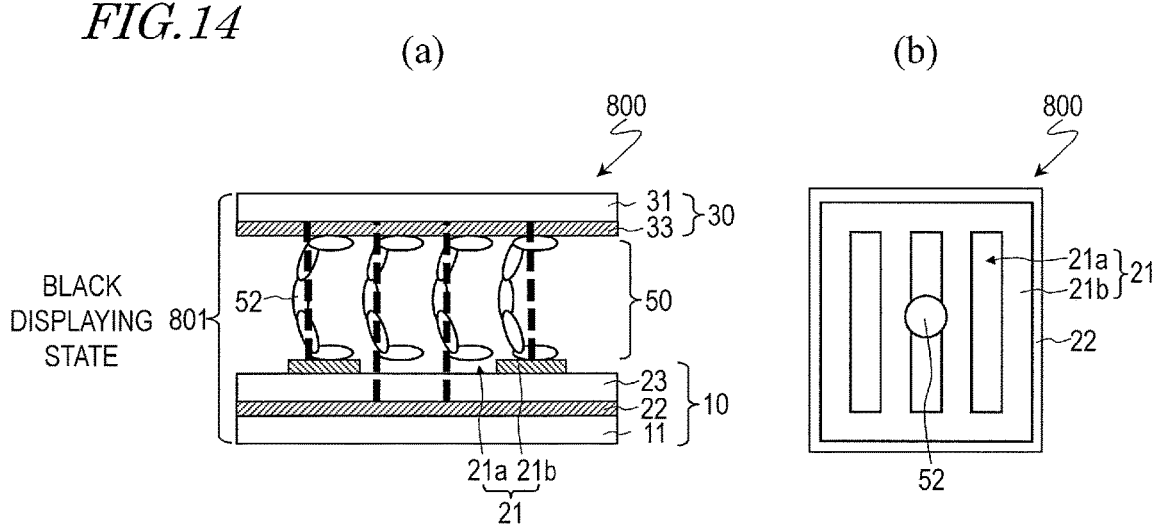
FIG. 14(a) and FIG. 14(b) are a cross-sectional view and a plan view showing the state of alignment of liquid crystal molecules 52 in a black displaying state of the liquid crystal display device 800 of Reference Example.

FIGS. 14(*a*) and 14(*b*) show the state of alignment of the liquid crystal molecules 52 in the black displaying state. In the black displaying state, a predetermined voltage is applied between the counter electrode 33 and the upper layer electrode 21 and the lower layer electrode 22 (for example, a potential of 0 V is applied to the counter electrode 33 while a potential of 7.5 V is applied to the upper layer electrode 21 and the lower layer electrode 22), so that a longitudinal electric field is produced across the liquid crystal layer 50. FIG. 14(*a*) schematically shows lines of electric force produced in this case by means of broken lines.

In this black displaying state, the liquid crystal molecules 52 of the liquid crystal layer 50 are aligned substantially perpendicular to the substrate surface (the surfaces of the rear substrate 10 and the front substrate 30), i.e., aligned substantially parallel to the normal direction of the liquid crystal layer 50, as shown in FIGS. 14(*a*) and 14(*b*). Note that liquid crystal molecules 52 which are very near the first horizontal alignment film 24 and the second horizontal alignment film 34 (also referred to as "interfacial liquid crystal") are strongly affected by the alignment regulating forces of the first horizontal alignment film 24 and the second horizontal alignment film 34 and therefore remain aligned substantially parallel to the substrate surface. However, in the other region (i.e., large part of the liquid crystal layer 50), liquid crystal molecules 52 (also referred to as "bulk liquid crystal") are aligned substantially perpendicular to the substrate surface and, thus, black displaying can be carried out with no difficulties.

Figure 15:
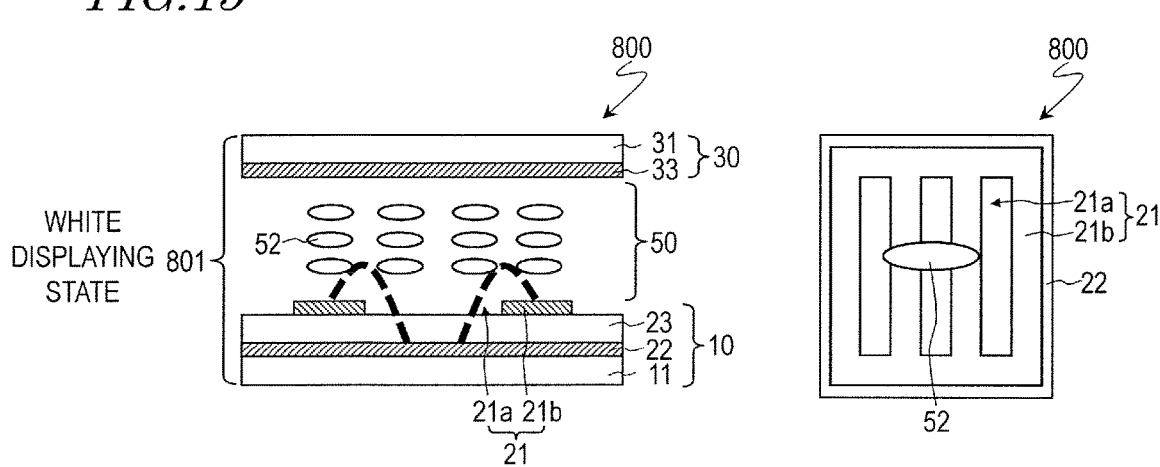
FIG. 15(a) and FIG. 15(b) are a cross-sectional view and a plan view showing the state of alignment of the liquid crystal molecules 52 in a white displaying state of the liquid crystal display device 800 of Reference Example.
Figure 16:
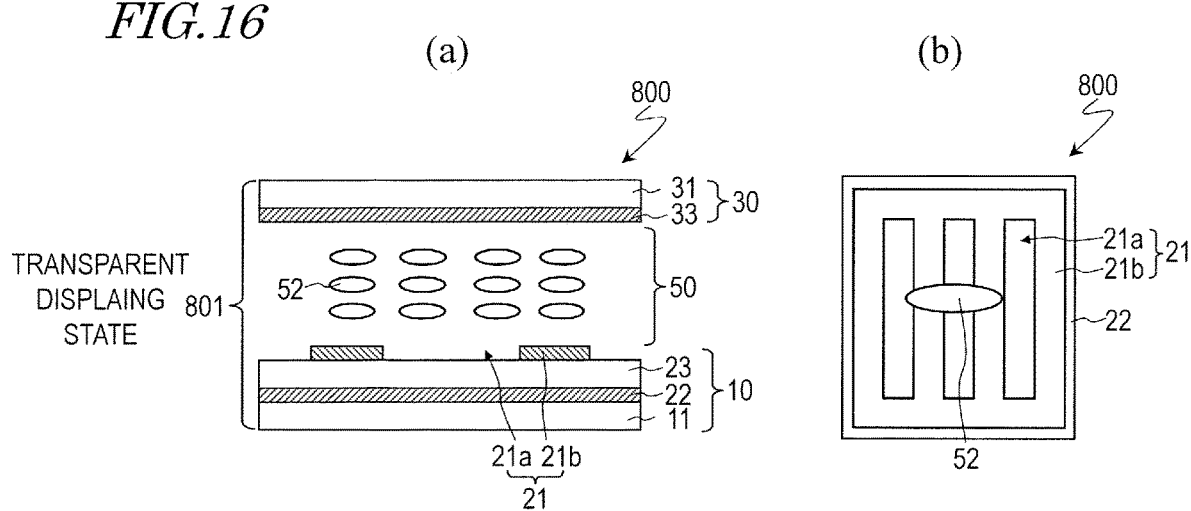
FIG. 16(a) and FIG. 16(b) are a cross-sectional view and a plan view showing the state of alignment of the liquid crystal molecules 52 in a transparent displaying state of the liquid crystal display device 800 of Reference Example.

FIGS. 15(*a*) and 15(*b*) show the state of alignment of the liquid crystal molecules 52 in the white displaying state. In the white displaying state, a predetermined voltage is applied between the upper layer electrode 21 and the lower layer electrode 22 (for example, a potential of 0 V is applied to the upper layer electrode 21 and the counter electrode 33 while a potential of 7.5 V is applied to the lower layer electrode 22), so that a transverse electric field (fringe electric field) is produced across the liquid crystal layer 50. FIG. 15(*a*) schematically shows lines of electric force produced in this case by means of broken lines.

In this white displaying state, the liquid crystal molecules 52 of the liquid crystal layer 50 are aligned substantially parallel to the substrate surface (i.e., aligned substantially perpendicular to the normal direction of the liquid crystal layer 50) as shown in FIGS. 15(*a*) and 15(*b*). More specifically, the liquid crystal molecules 52 are aligned substantially perpendicular to the extending direction d1 of the slits 21a of the upper layer electrode 21. That is, the liquid crystal molecules 52 are aligned so as to form an angle of about 45° to the respective transmission axes 25a and 35a of the first polarizer 25 and the second polarizer 35.

FIGS. 16(a) and 16(b) show the state of alignment of the liquid crystal molecules 52 in the transparent displaying state. In the transparent displaying state, no voltage is applied across the liquid crystal layer 50 (for example, a potential of 0 V is applied to each of the upper layer electrode 21, the lower layer electrode 22 and the counter electrode 33), so that none of a longitudinal electric field and a transverse electric field is produced across the liquid crystal layer 50.

In this transparent displaying state, the liquid crystal molecules 52 of the liquid crystal layer 50 are in a homogeneous alignment as shown in FIGS. 16(a) and 16(b). That is, the liquid crystal molecules 52 are aligned substantially parallel to the substrate surface (i.e., substantially perpendicular to the normal direction of the liquid crystal layer 50). More specifically, the liquid crystal molecules 52 are aligned substantially perpendicular to the extending direction d1 of the slits 21a of the upper layer electrode 21. That is, the liquid crystal molecules 52 are aligned so as to form an angle of about 45° to the respective transmission axes 25a and 35a of the first polarizer 25 and the second polarizer 35. In this transparent displaying state, each pixel of the liquid crystal display device 800 of Reference Example has the highest light transmittance (i.e., a higher light transmittance than in any of the black displaying state and the white displaying state).

As described above, in the liquid crystal display device 800 of Reference Example, each pixel can exhibit not only the black displaying state and the white displaying state but also the transparent displaying state where no voltage is applied across the liquid crystal layer 50. Displaying of the background scene is carried out in this transparent displaying state, so that occurrence of the problem of blurred background scenes (double vision) can be prevented. Thus, excellent display quality can be achieved.

Figure 17:
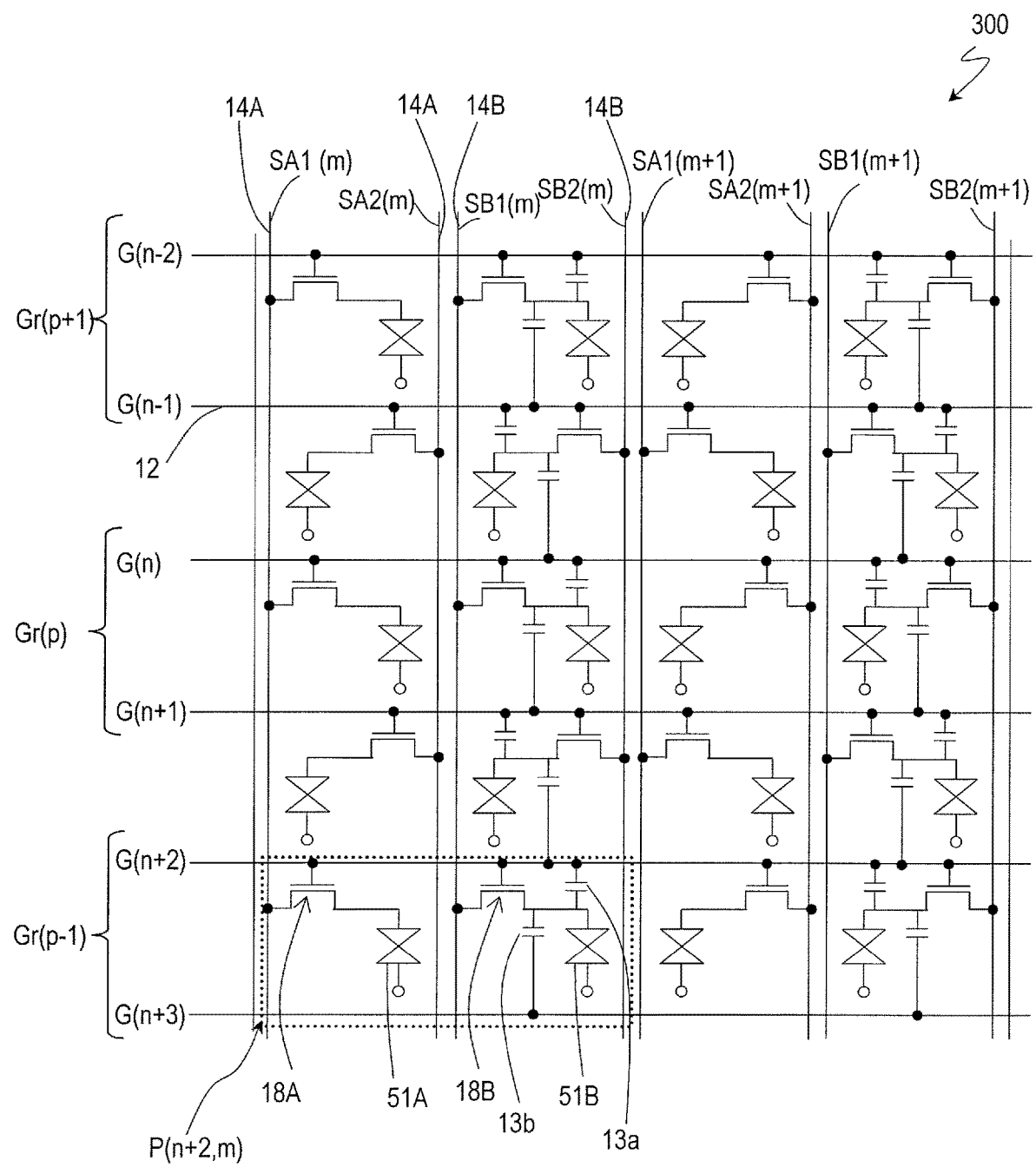
FIG. 17 is a diagram schematically showing an equivalent circuit (for 10 pixels in 5 rows and 2 columns) of a liquid crystal display device 300 of Embodiment 3 of the present invention.
Figure 18:
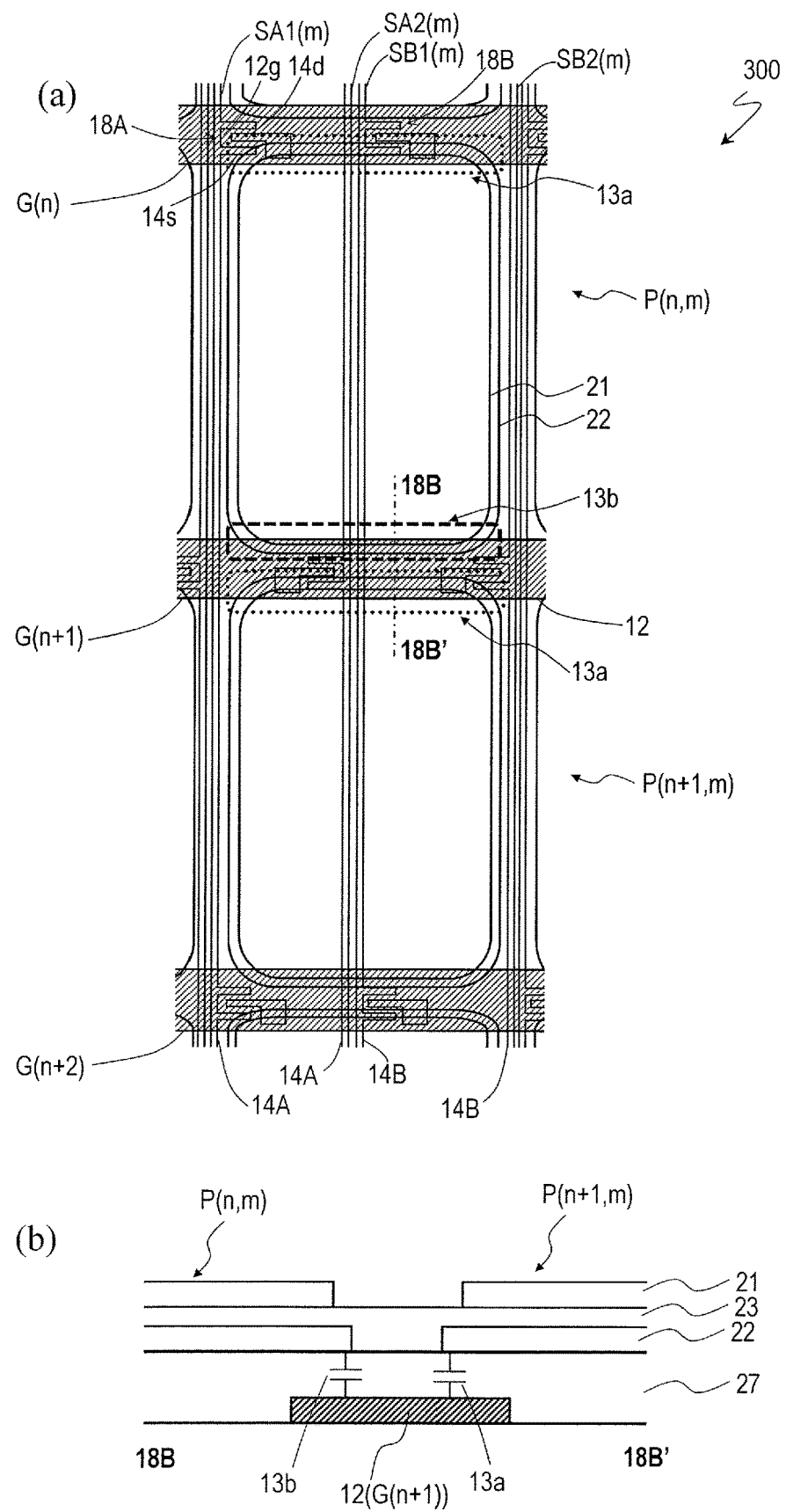
FIG. 18 is for illustrating an example of the configuration (pixel structure) in which the first capacitor 13a and the second capacitor 13b are formed.
Figure 19:
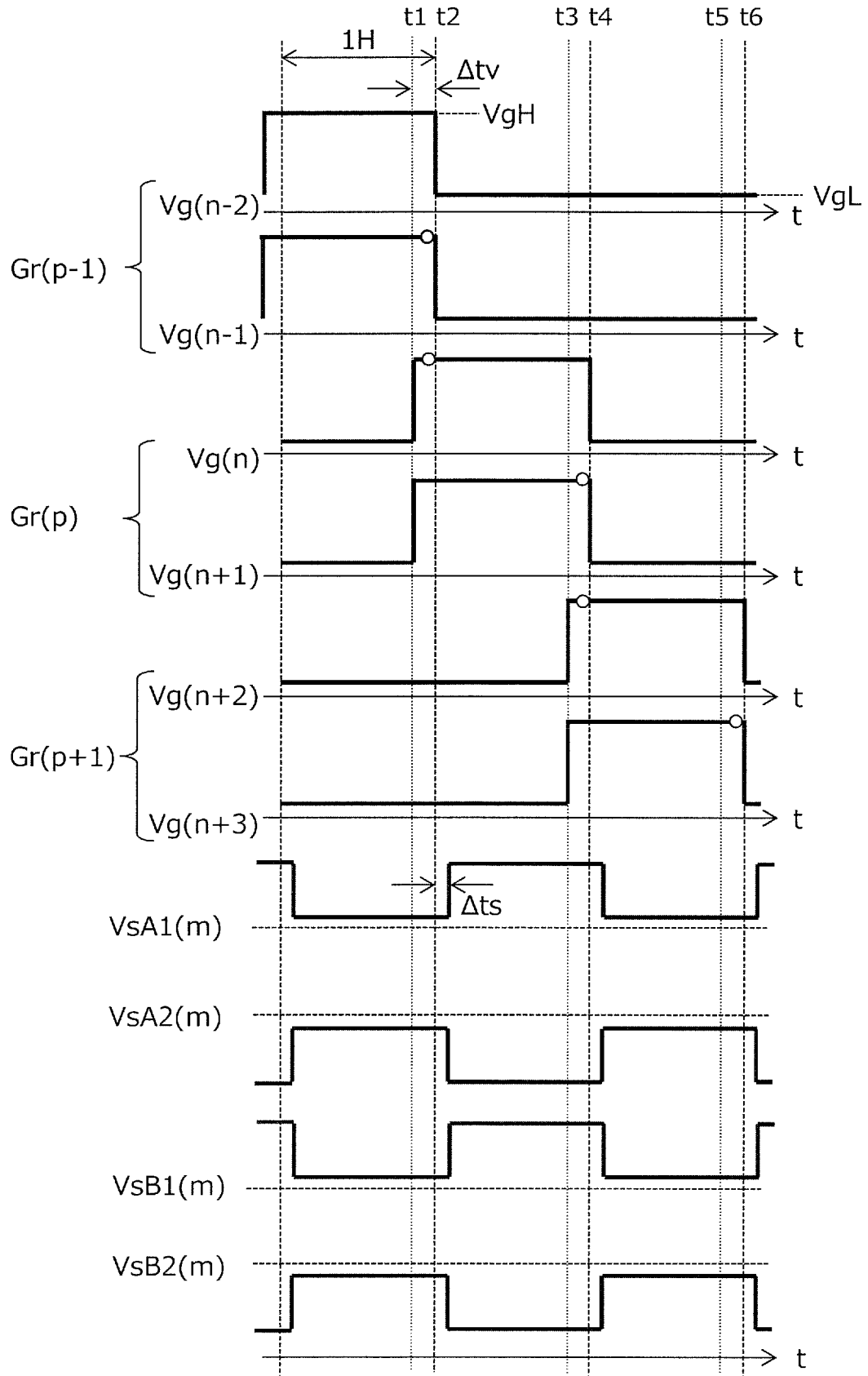
FIG. 19 is a diagram showing the waveforms of scan signal voltages Vg and display signal voltages Vs used in driving the liquid crystal display device 300.

The liquid crystal display device 300 of Embodiment 3 of the present invention is described with reference to FIG. 17 to FIG. 19. FIG. 17 is a diagram schematically showing an equivalent circuit (for 10 pixels in 5 rows and 2 columns) of the liquid crystal display device 300. FIG. 18 is for illustrating an example of the configuration (pixel structure) in which the first capacitor 13a and the second capacitor 13b are formed. FIG. 18(a) is an example of a plan view schematically showing the liquid crystal display device 300. FIG. 18(b) is a schematic cross-sectional view of the rear substrate 10 taken along line 18B-18B' of FIG. 18(a). FIG. 19 is a diagram showing the waveforms of scan signal voltage Vg and display signal voltage Vs used in driving the liquid crystal display device 300.

In the liquid crystal display device 800 of Reference Example, each pixel column is associated with any one of the first source bus lines 14A and any one of the second source bus lines 14B. In comparison, in the liquid crystal display device 300 of the present embodiment, each pixel column is associated with any two of the first source bus lines 14A and any two of the second source bus lines 14B.

As shown in FIG. 17, the first source bus lines 14A that are associated with the $m^{th}$ pixel column are also referred to as the first source bus lines SA1(m) and SA2(m), and the second source bus lines 14B that are associated with the $m^{th}$ pixel column are also referred to as the second source bus lines SB1(m) and SB2(m). In the drawing, one of the first source bus lines 14A associated with the $m^{th}$ pixel column which is on the left side is referred to as the first source bus line SA1(m), and the other first source bus line 14A which is on the right side is referred to as the first source bus line SA2(m). Likewise, one of the second source bus lines 14B associated with the $m^{th}$ pixel column which is on the left side is referred to as the second source bus line SB1(m), and the other second source bus line 14B which is on the right side is referred to as the second source bus line SB2(m).

The plurality of pixel rows include a plurality of pixel row groups. Each of the pixel row groups includes two pixel rows which adjoin each other in a column direction. In each pixel column, two pixel rows included in each of the plurality of pixel row groups are associated with different first source bus lines 14A and are associated with different second source bus lines 14B. With this feature, even if two pixel rows included in each pixel row group are concurrently selected, different display signal voltages can be supplied to these two pixel rows.

The liquid crystal capacitor 51 of each of the plurality of pixels includes a transverse electric field component whose electrostatic capacitance value varies depending on the transverse electric field (i.e., the liquid crystal capacitor formed by the upper layer electrode 21, the lower layer electrode 22 and the liquid crystal layer 50) and a longitudinal electric field component whose electrostatic capacitance value varies depending on the longitudinal electric field (the liquid crystal capacitor formed by the upper layer electrode 21 and the lower layer electrode 22, the counter electrode 33, and the liquid crystal layer 50). In the electrical equivalent circuit, the liquid crystal capacitor 51 is separately represented as the first liquid crystal capacitor 51A that is electrically connected to the upper layer electrode 21 and the second liquid crystal capacitor 51B that is electrically connected to the lower layer electrode 22. The first liquid crystal capacitor 51A and the second liquid crystal capacitor 51B do not necessarily correspond to the transverse electric field component and the longitudinal electric field component of the liquid crystal capacitor 51.

Between the lower layer electrode 22 of each pixel and the corresponding gate bus line 12, the first capacitor 13a is formed. That is, the lower layer electrode 22 is capacitively coupled with the corresponding gate bus line 12 via the first capacitor 13a.

Between the lower layer electrode 22 of each pixel and the non-corresponding gate bus line 12, the second capacitor 13b is formed. That is, the lower layer electrode 22 is capacitively coupled with the non-corresponding gate bus line 12 via the second capacitor 13b.

An example of the configuration (pixel structure) in which the first capacitor 13a and the second capacitor 13b are formed is shown in FIG. 18. FIG. 18(a) is an example of a plan view schematically showing the liquid crystal display device 300. FIG. 18(b) is a schematic cross-sectional view of the rear substrate 10 taken along line 188-18B' of FIG. 18(a). In FIG. 18(a), for the sake of visibility, the slits 21a of the upper layer electrode 21 are not shown.

As shown in FIG. 18(a), when viewed in the normal direction of the rear substrate 10, the lower layer electrode 22 of the pixel P(n, m) overlaps with the gate bus line G(n) that is associated with the $n^{th}$ pixel row. Likewise, when viewed in the normal direction of the rear substrate 10, the lower layer electrode 22 of the pixel P(n+1, m) overlaps with the gate bus line G(n+1). As shown in FIG. 18(b), the first capacitor 13a is formed by, for example, the lower layer electrode 22 of the $(n+1)^{th}$ pixel row, the gate bus line G(n+1), and an insulating layer 27 interposed therebetween.

When viewed in the normal direction of the rear substrate 10, the lower layer electrode 22 of the pixel P(n, m) overlaps with the gate bus line G(n+1) that is associated with the (n+1)$^{th}$ pixel row. As shown in FIG. 18(b), the second capacitor 13b is formed by, for example, the lower layer electrode 22 of the n$^{th}$ pixel row, the gate bus line G(n+1), and the insulating layer 27 interposed therebetween.

As shown in FIG. 19, the liquid crystal display device 300 is driven such that, in each frame period, a scan signal voltage supplied to the gate bus lines G(n+2) and G(n+3) that are associated with the (p+1)$^{th}$ group Gr(p+1) switches from VgL (low) to VgH (high) before a scan signal voltage supplied to the gate bus lines G(n) and G(n+1) that are associated with the p$^{th}$ group Gr(p) switches from VgH (high) to VgL (low). With this feature, occurrence of display unevenness which is attributed to such a driving method that the gate bus lines are selected in a group by group manner with a common scan signal voltage can be suppressed.

Figure 20:
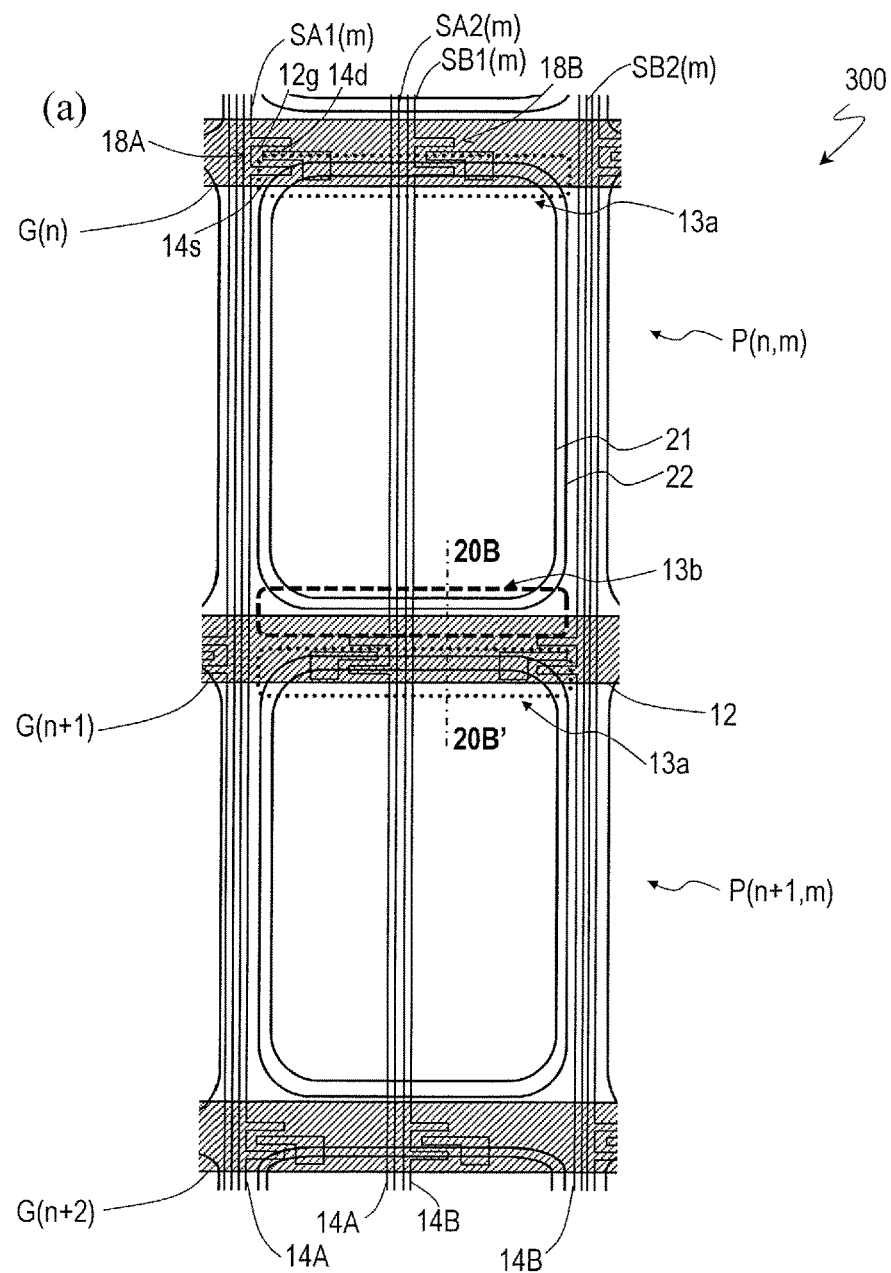
FIG. 20 is for illustrating another example of the configuration (pixel structure) in which the first capacitor 13a and the second capacitor 13b are formed.
Figure 20:
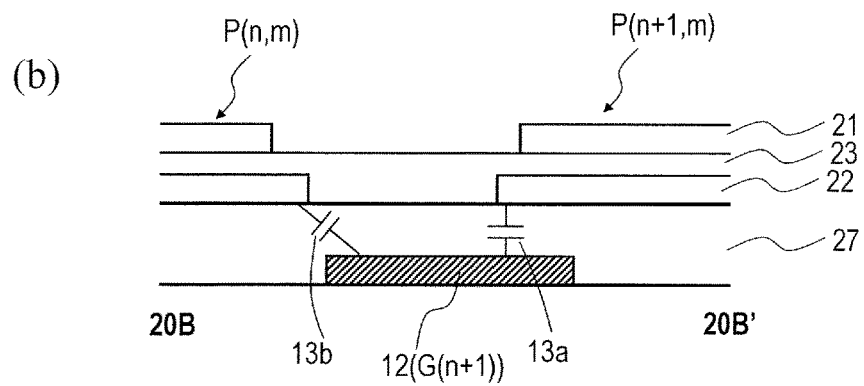

The configuration of the second capacitor 13b is not limited to that shown in FIG. 18. The second capacitor 13b can be formed even when the lower layer electrode 22 does not overlap with the gate bus lines 12 as shown in FIG. 20. FIG. 20(a) is another example of a plan view schematically showing the liquid crystal display device 300. FIG. 20(b) is a schematic cross-sectional view of the rear substrate 10 taken along line 20B-20B' of FIG. 20(a).

As shown in FIG. 20, even if the lower layer electrode 22 of the pixel P(n, m) does not overlap with the gate bus line G(n+1) that is associated with the (n+1)$^{th}$ pixel row when viewed in the normal direction of the rear substrate 10, the second capacitor 13b can be formed between the lower layer electrode 22 of the pixel P(n, m) and the gate bus line G(n+1). As shown in FIG. 20(b), the second capacitor 13b is formed by, for example, the lower layer electrode 22 of the pixel P(n, m), the gate bus line G(n+1), and the insulating layer 27 interposed therebetween.

As previously described, usually, as the area of the upper layer electrode 21 and the area of the lower layer electrode 22 increase, the aperture ratio of the liquid crystal display device 300 can be improved. To improve the aperture ratio of the liquid crystal display device 300, in many cases, the upper layer electrode 21 and the lower layer electrode 22 are arranged so as to overlap with the gate bus line 12 as shown in FIG. 18, rather than the configuration shown in FIG. 20. In this case, usually, electrostatic capacitance value CCB of the second capacitor Ccb is large as compared with the configuration shown in FIG. 20. Therefore, feedthrough voltage ΔVb which is attributed to the influence of the second capacitor Ccb is large and, therefore, display unevenness is readily visually perceived. According to a driving method of the embodiment of the present invention, occurrence of display unevenness can be suppressed in such a case.

In FIG. 18 and FIG. 20, the area of the upper layer electrode 21 is shown as being smaller than the area of the lower layer electrode 22, although the configuration of the rear substrate 10 is not limited to this example. The area of the upper layer electrode 21 may be larger than the area of the lower layer electrode 22. Alternatively, the area of the upper layer electrode 21 and the area of the lower layer electrode 22 may be equal to each other. Note that, however, it is preferred that all of the slits 21a overlap with the lower layer electrode 22 when viewed in the normal direction of the rear substrate 10.

In the liquid crystal display device 300, the connection between the TFTs 18 and the source bus lines 14 is not limited to the example shown in FIG. 17. It is preferred to exhibit a one-row, one-column dot inversion state in each frame period. In this case, occurrence of flickers can be suppressed.

It is preferred that, in each frame period, the polarity of a display signal voltage supplied to a first source bus line 14A which is associated with a certain pixel is equal to the polarity of a display signal voltage supplied to a second source bus line 14B which is associated with the certain pixel. If the polarities of these display signal voltages are different, display signal voltages of different polarities are supplied to the upper layer electrode 21 and the lower layer electrode 22 of the same pixel and, thus, an excellent black displaying state cannot be obtained in some cases.

Display signal voltages supplied to any two of the plurality of source bus lines 14 (including a plurality of first source bus lines 14A and a plurality of second source bus lines 14B) which adjoin each other preferably have different polarities.

Figure 21:
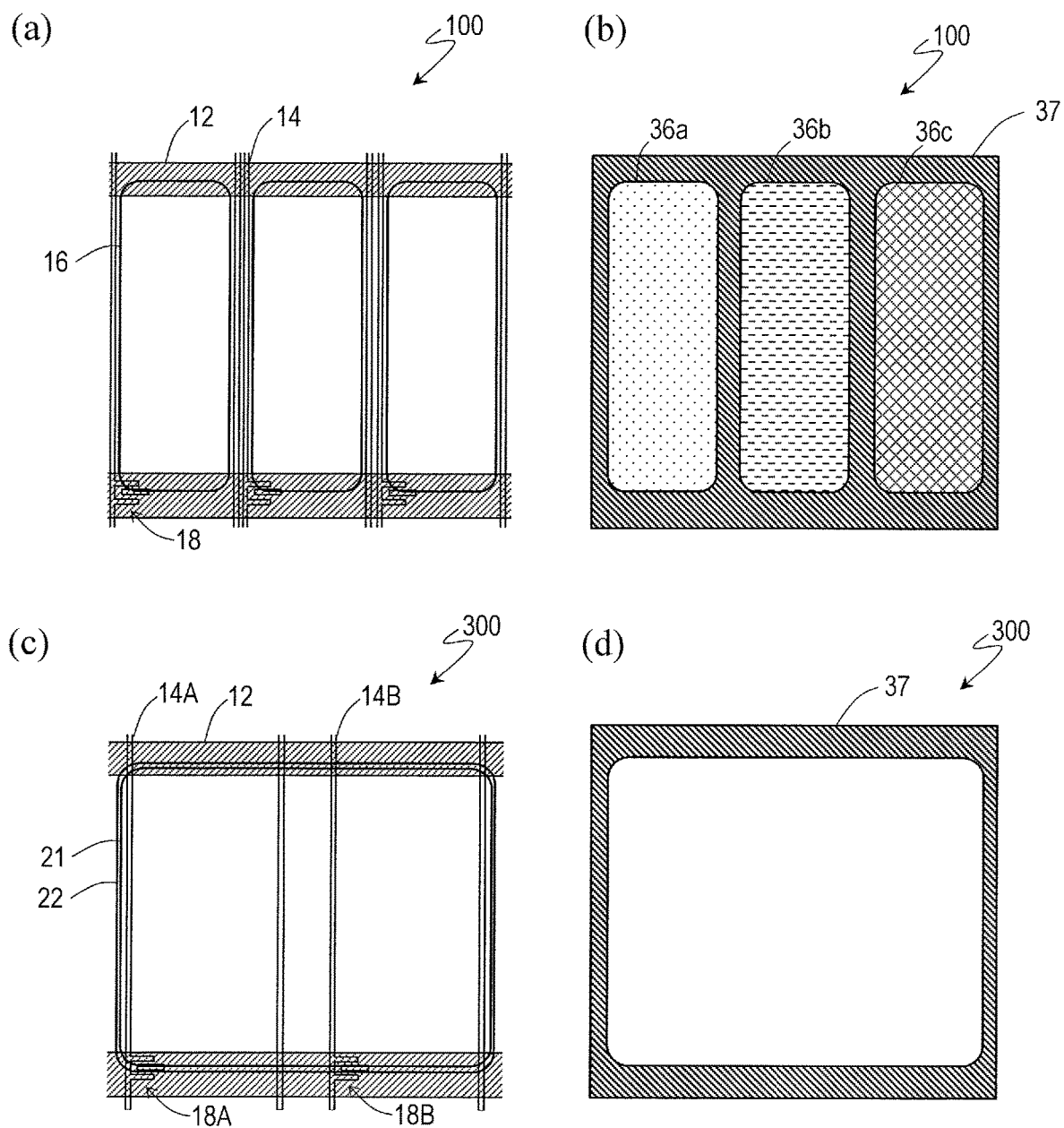
FIG. 21 is for illustrating the aperture ratios of the liquid crystal display device 100 and the liquid crystal display device 300.

The aperture ratio of the liquid crystal display device 300 is described with reference to FIG. 21. FIG. 21 is for illustrating the aperture ratios of the liquid crystal display device 100 and the liquid crystal display device 300. FIG. 21(a) is a plan view schematically showing the TFT substrate 10 of the liquid crystal display device 100. FIG. 21(b) is a plan view schematically showing a counter substrate 30 of the liquid crystal display device 100. FIG. 21(c) is a plan view schematically showing the rear substrate 10 of the liquid crystal display device 300. FIG. 21(d) is a plan view schematically showing the front substrate 30 of the liquid crystal display device 300.

FIG. 21 schematically shows, as for the liquid crystal display device 100, a portion corresponding to a single color display pixel. The color display pixel consists of three color pixels, a R (red) pixel, a G (green) pixel, and a B (blue) pixel, and a R pixel column, a G pixel column, and a B pixel column are arranged in the form of stripes. FIG. 21 schematically shows, as for the liquid crystal display device 300, a portion corresponding to a single pixel.

In the liquid crystal display device 300, as shown in FIG. 21(c), each pixel column is associated with two first source bus lines 14A and two second source bus lines 14B (i.e., four source bus lines 14). In comparison, in the liquid crystal display device 100, as shown in FIG. 21(a), each pixel column is associated with two source bus lines 14. When respective pixel row groups include an equal number of pixel rows, the number of source bus lines 14 associated with each pixel column in the liquid crystal display device 300 is twice the number of source bus lines 14 associated with each pixel column in the liquid crystal display device 100. This is because each pixel of the liquid crystal display device 300 includes the first TFT 18A and the second TFT 18B. When only this point is considered, it may be said that the liquid crystal display device 300 is inferior to the liquid crystal display device 100 from the viewpoint of improving the aperture ratio.

However, the counter substrate 30 of the liquid crystal display device 100 includes a color filter layer and a light blocking layer (black matrix) 37 as shown in FIG. 21(b). The color filter layer includes, for example, three types of color filters which transmit light of different colors, the first color filter 36a, the second color filter 36b and the third color filter 36c. Usually, to suppress mixing of colors between pixels, a region which includes the source bus lines 14 is provided with the light blocking layer 37 in many cases. Also, in consideration of misalignment between the TFT substrate 10 and the counter substrate 30, the light blocking layer 37 can be set so as to have a larger area. In comparison, as previously described, in the liquid crystal display device 300, color displaying is carried out in a field sequential fashion and, therefore, the liquid crystal display panel of the liquid crystal display device 300 does not need color filters. Therefore, it is not necessary to provide the light blocking layer 37 in a region which includes the source bus lines 14. Thus, in the liquid crystal display device 300, decrease of the aperture ratio is suppressed.

Further, in the liquid crystal display device 100, as the number of source bus lines associated with each pixel column increases, the width of the light blocking layer 37 in a region which includes the source bus lines 14 increases. Accordingly, the aperture ratio can decrease. In comparison, in the liquid crystal display device 300, even if the number of source bus lines 14 associated with each pixel column increases, it is still not necessary to provide the light blocking layer 37 in a region which includes the source bus lines 14. Therefore, in the liquid crystal display device 300, decrease of the aperture ratio which is attributed to the increase in the number of source bus lines 14 is suppressed.

The liquid crystal display device 300 carries out color displaying in a field sequential fashion and is therefore required to be driven at a high speed as compared with the liquid crystal display device 100 that includes color filters. According to a driving method of the embodiment of the present invention, even if the liquid crystal display device 300 is driven at a high speed, the effect of securing a charge time in each pixel is achieved, and occurrence of display unevenness can be suppressed.

The number of pixel rows included in each pixel row group is not limited to two. Each pixel row group may include N pixel rows which adjoin one another in a column direction (N is an integer not less than 3). In the example illustrated in FIG. 22, N=4.

Figure 22:
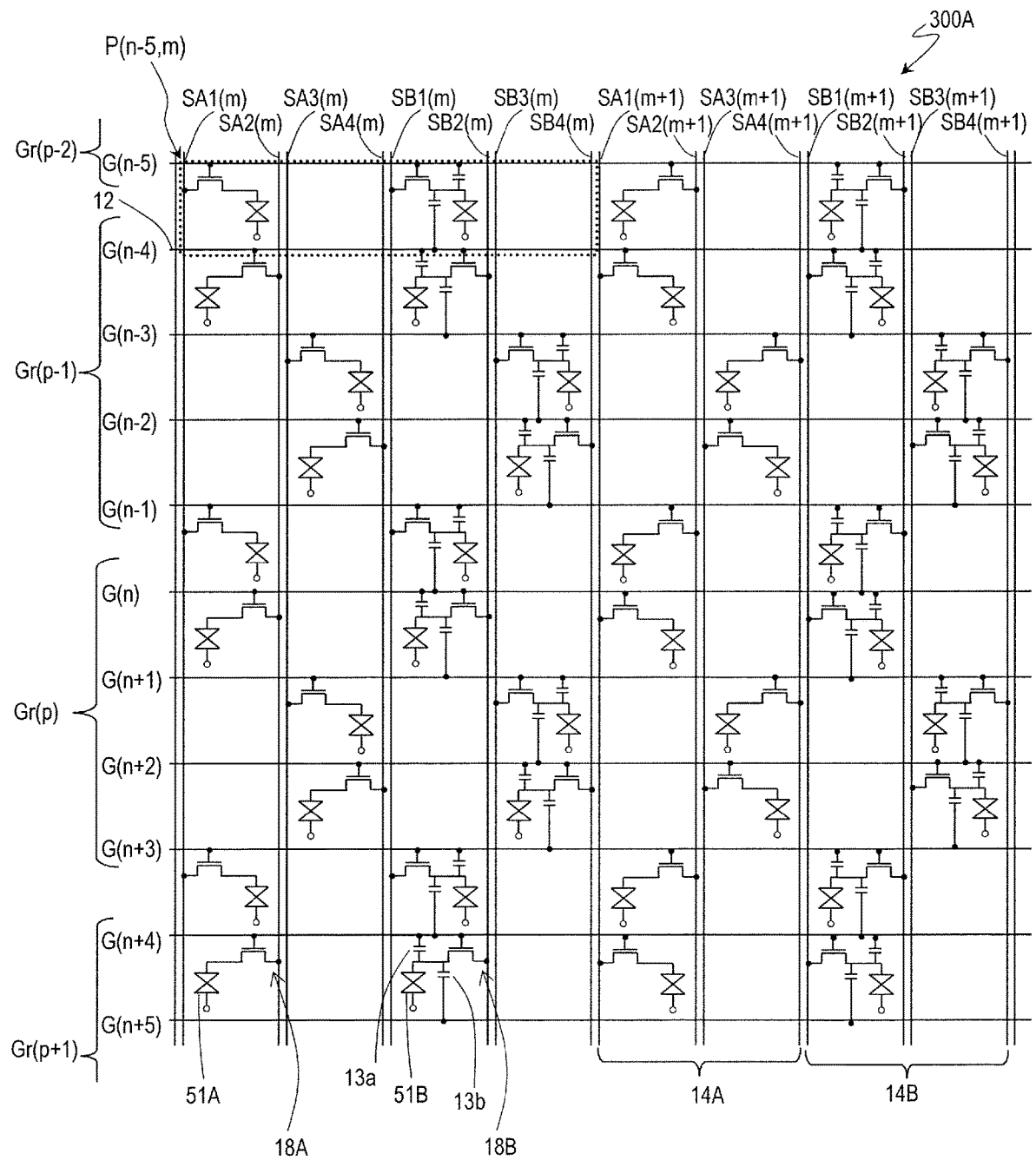
FIG. 22 is a diagram schematically showing an equivalent circuit (for 20 pixels in 10 rows and 2 columns) of a liquid crystal display device 300A that is a variation of the liquid crystal display device 300.

A liquid crystal display device 300A that is a variation of the liquid crystal display device 300 is described with reference to FIG. 22. FIG. 22 is a diagram schematically showing an equivalent circuit (for 20 pixels in 10 rows and 2 columns) of the liquid crystal display device 300A. In driving the liquid crystal display device 300A, for example, the scan signal voltages shown in FIG. 9 are used.

In the liquid crystal display device 300, each pixel row group includes two pixel rows which adjoin each other in a column direction. Each pixel column is associated with any two of the first source bus lines 14A and any two of the second source bus lines 14B. In comparison, in the liquid crystal display device 300A, each pixel row group includes four pixel rows which adjoin one another in a column direction. Each pixel column is associated with any four of the first source bus lines 14A and any four of the second source bus lines 14B (i.e., eight source bus lines 14). The first source bus lines 14A associated with the m$^{th}$ pixel column are also referred to as the first source bus lines SA1(m), SA2(m), SA3(m) and SA4(m), and the second source bus lines 14B associated with the m$^{th}$ pixel column are also referred to as the second source bus lines SB1(m), SB2(m), SB3(m) and SB4(m). In the drawing, the first source bus lines 14A associated with the m$^{th}$ pixel column are referred to, from left to right, as the first source bus lines SA1(m), SA2(m), SA3(m) and SA4(m), and the second source bus lines 14B associated with the m$^{th}$ pixel column are referred to, from left to right, as the second source bus lines SB1(m), SB2(m), SB3(m) and SB4(m). In each pixel column, four pixel rows included in each of the plurality of pixel row groups are associated with different first source bus lines 14A and are associated with different second source bus lines 14B.

Also in the liquid crystal display device 300A that has the above-described configuration, the same effects as those of the liquid crystal display device 300 can be achieved. The liquid crystal display device 300A is capable of suppressing occurrence of display unevenness which is attributed to the driving method of Comparative Example 3 that has previously been described with reference to FIG. 25.

In the liquid crystal display device 300A, the connection between the TFTs 18 and the source bus lines 14 is not limited to the example illustrated in FIG. 22 but may be appropriately adjusted so as to exhibit a one-row, one-column dot inversion state in each frame period.

INDUSTRIAL APPLICABILITY

According to an embodiment of the present invention, occurrence of display unevenness which is attributed to such a driving method that the gate bus lines are selected in a group by group manner with a common scan signal voltage can be suppressed. A liquid crystal display device of an embodiment of the present invention can be used as a longitudinal or transverse electric field mode liquid crystal display device. Also, a liquid crystal display device of an embodiment of the present invention can be used as a liquid crystal display device which has excellent response characteristics and which is suitably used as a see-through display.

REFERENCE SIGNS LIST

1A, 1B liquid crystal display panel
10 first substrate (TFT substrate, rear substrate)
11 first transparent substrate
12 gate bus line
13a first capacitor (parasitic capacitor)
13b second capacitor (parasitic capacitor)
14 source bus line
14A, 14B first and second source bus lines
16 pixel electrode
18 TFT
18A, 18B first and second TFTs
19 common electrode
21 first electrode (upper layer electrode)
22 second electrode (lower layer electrode)
30 second substrate (counter substrate, front substrate)
31 second transparent substrate
33 counter electrode
50 liquid crystal layer
51, 51A, 51B liquid crystal capacitor
100, 100A, 100B, 200, 300, 300A liquid crystal display device

The invention claimed is:
1. A liquid crystal display device comprising:
a plurality of pixels arranged in a matrix pattern having a plurality of rows and a plurality of columns, each of the pixels having a pixel electrode;
a plurality of gate bus lines, each of the gate bus lines being associated with any of a plurality of pixel rows of the plurality of pixels;
a plurality of source bus lines, each of the source bus lines being associated with any of a plurality of pixel columns of the plurality of pixels; and
a plurality of TFTs, each of the TFTs being associated with any of the plurality of pixels,
wherein the plurality of pixel rows include a plurality of pixel row groups, each of the pixel row groups including N pixel rows which adjoin one another in a column direction (N is an integer not less than 2), each of the plurality of pixel row groups being selected by a common scan signal voltage in each frame period, N pixel rows in each of the plurality of pixel row groups are associated with different ones of the source bus lines in each pixel column, where, in each frame period, a $p^{th}$ selected one of the pixel row groups is a $p^{th}$ group (p is an integer not less than 1), and two pixel rows of the plurality of pixel rows which adjoin each other in a column direction and which are included in different ones of the pixel row groups are a first pixel row and a second pixel row, the first pixel row includes a pixel which has one of the pixel electrodes capacitively coupled with one of the gate bus lines which is associated with the second pixel row, and when the first pixel row is included in a $q^{th}$ group (q is an integer not less than 1) and the second pixel row is included in a $(q+1)^{th}$ group, in each frame period, a scan signal voltage supplied to the gate bus lines which are associated with the $(q+1)^{th}$ group switches from low to high before a scan signal voltage supplied to the gate bus lines which are associated with the $q^{th}$ group switches from high to low.

2. The liquid crystal display device of claim 1, wherein in each frame period, a polarity of a display signal voltage supplied to each of the plurality of source bus lines does not change.

3. The liquid crystal display device of claim 2, Wherein in each frame period, display signal voltages supplied to two of the plurality of source bus lines which adjoin each other have different polarities.

4. The liquid crystal display device of claim 1, further comprising a liquid crystal display panel, the liquid crystal display panel including a first substrate and a second substrate which oppose each other and a liquid crystal layer interposed between the first substrate and the second substrate, wherein the first substrate includes the pixel electrode, and the second substrate includes a counter electrode which is arranged so as to oppose the pixel electrode.

5. The liquid crystal display device of claim 4, wherein when viewed in a normal direction of the first substrate, the pixel electrode of the first pixel row overlaps with the gate bus line associated with the second pixel row.

6. The liquid crystal display device of claim 1, further comprising a liquid crystal display panel, the liquid crystal display panel including a first substrate and a second substrate which oppose each other and a liquid crystal layer interposed between the first substrate and the second substrate, wherein the first substrate includes the pixel electrode and a common electrode which cooperates with the pixel electrode to produce a transverse electric field across the liquid crystal layer.

7. The liquid crystal display device of claim 6, wherein the common electrode is closer to the liquid crystal layer than the pixel electrode is.

8. The liquid crystal display device of claim 1, further comprising a liquid crystal display panel, the liquid crystal display panel including a first substrate and a second substrate which oppose each other and a liquid crystal layer interposed between the first substrate and the second substrate, wherein the first substrate includes a first electrode provided in each of the plurality of pixels and a second electrode which cooperates with the first electrode to produce a transverse electric field across the liquid crystal layer, the second substrate includes a third electrode which is arranged so as to oppose the first electrode and the second electrode and which cooperates with the first electrode and the second electrode to produce a longitudinal electric field across the liquid crystal layer, and at least one of the first electrode and the second electrode is the pixel electrode.

9. The liquid crystal display device of claim 8, wherein each of the plurality of pixels is capable of exhibiting, in a switchable manner, a black displaying state where black displaying is carried out with a longitudinal electric field produced across the liquid crystal layer, a white displaying state where white displaying is carried out with a transverse electric field produced across the liquid crystal layer, and a transparent displaying state where a rear surface side of the liquid crystal display panel is viewable through the liquid crystal display panel with no voltage applied across the liquid crystal layer.

10. The liquid crystal display device of claim 8, wherein the plurality of TFTs include a plurality of first TFTs and a plurality of second TFTs, each of the plurality of first TFTs and the plurality of second TFTs being associated with any of the plurality of pixels, the plurality of source bus lines include a plurality of first source bus lines, each of which is connected with any of the plurality of first TFTs, and a plurality of second source bus lines, each of which is connected with any of the plurality of second TFTs, and N pixel rows included in each of the plurality of pixel row groups are, in each pixel column, associated with different ones of the first source bus lines and associated with different ones of the second source bus lines.

11. The liquid crystal display device of claim 10, Wherein in each frame period, a polarity of a display signal voltage supplied to one of the first source bus lines which is associated with a certain pixel is equal to a polarity of a display signal voltage supplied to one of the second source bus lines which is associated with the certain pixel.

12. The liquid crystal display device of claim 8, further comprising a lighting device which is capable of irradiating the liquid crystal display panel with light of a plurality of colors, including red light, green light and blue light, in a switchable manner, for color displaying in a field sequential fashion.

13. The liquid crystal display device of claim 8, wherein the liquid crystal display panel does not include color filters.

14. The liquid crystal display device of claim 1, wherein the pixel row group includes four or more pixel rows.

15. The liquid crystal display device of claim 1, wherein in each frame period, a length of a time period from a point when the scan signal voltage supplied to the gate bus lines which are associated with the $(q+1)^{th}$ group switches from low to high to a point when the scan signal voltage supplied to the gate bus lines which are associated with the $q^{th}$ group switches from high to low is less than a length of a horizontal scanning period.

16. A driving method of a liquid crystal display device, the liquid crystal display device including a plurality of pixels arranged in a matrix pattern having a plurality of rows and a plurality of columns, each of the pixels having a pixel electrode;

a plurality of gate bus lines, each of the gate bus lines being associated with any of a plurality of pixel rows of the plurality of pixels;

a plurality of source bus lines, each of the source bus lines being associated with any of a plurality of pixel columns of the plurality of pixels; and a plurality of TFTs, each of the TFTs being associated with any of the plurality of pixels, wherein the plurality of pixel rows include a plurality of pixel row groups, each of the pixel row groups including N pixel rows which adjoin one another in a column direction (N is an integer not less than 2), N pixel rows in each of the plurality of pixel row groups are associated with different ones of the source bus lines in each pixel column, and where two pixel rows of the plurality of pixel rows which adjoin each other in a column direction and which are included in different ones of the pixel row groups are a first pixel row and a second pixel row, the first pixel row includes a pixel which has one of the pixel electrodes capacitively coupled with one of the gate bus lines which is associated with the second pixel row, the method comprising a step of (a) selecting each of the plurality of pixel row groups with a common scan signal voltage in each frame period, wherein where, in each frame period, a $p^{th}$ selected one of the pixel row groups is a $p^{th}$ group (p is an integer not less than 1), in step (a), when the first pixel row is included in a $q^{th}$ group (q is an integer not less than 1), the second pixel row is included in a $(q+1)^{th}$ group, and step (a) includes a step of supplying to the gate bus lines associated with the $(q+1)^{th}$ group a scan signal voltage which switches from low to high before a scan signal voltage supplied to the gate bus lines which are associated with the $q^{th}$ group switches from high to low.

17. The method of claim 16, further comprising a step of (b) supplying to each of the plurality of source bus lines a display signal voltage whose polarity does not change in each frame period.

18. The method of claim 17, wherein step (b) includes a step of supplying display signal voltages which have different polarities to two of the plurality of source bus lines which adjoin each other.

19. The method of claim 16, wherein, in step (a), a length of a time period from a point when the scan signal voltage supplied to the gate bus lines which are associated with the $(q+1)^{th}$ group switches from low to high to a point when the scan signal voltage supplied to the gate bus lines which are associated with the $q^{th}$ group switches from high to low is less than a length of a horizontal scanning period.

* * * * *